US012670040B2

(12) United States Patent
Story et al.

(10) Patent No.: US 12,670,040 B2
(45) Date of Patent: Jun. 30, 2026

(54) ANALYZING USER ACTIVITY WITH RESPECT TO A COMPOSITE OBJECT

(71) Applicant: TRADING TECHNOLOGIES INTERNATIONAL, INC., Chicago, IL (US)

(72) Inventors: Evan J. Story, Chicago, IL (US); Morgan L. Trinkaus, Barrington Hills, IL (US); Jay A. Biondo, Western Springs, IL (US)

(73) Assignee: Trading Technologies International, Inc., Chicago, IL (US)

( * ) Notice: Subject to any disclaimer, the term of this patent is extended or adjusted under 35 U.S.C. 154(b) by 461 days.

(21) Appl. No.: 18/077,518

(22) Filed: Dec. 8, 2022

(65) Prior Publication Data

US 2024/0193013 A1     Jun. 13, 2024

(51) Int. Cl.
*G06F 9/54* (2006.01)
*G06F 11/30* (2006.01)
(Continued)

(52) U.S. Cl.
CPC .............. *G06F 9/542* (2013.01); *G06F 11/30* (2013.01); *G06F 11/3065* (2013.01); (Continued)

(58) Field of Classification Search
CPC ...... G06F 9/542; G06F 11/30; G06F 11/3065; G06F 11/3072; G06F 11/34; (Continued)

(56) References Cited

U.S. PATENT DOCUMENTS

| | | | | |
|---|---|---|---|---|
| 6,314,089 B1 * | 11/2001 | Szlam | ..................... | H04M 3/51 |
| | | | | 370/352 |
| 2002/0019945 A1 * | 2/2002 | Houston | ............. | H04L 63/1408 |
| | | | | 709/224 |

(Continued)

OTHER PUBLICATIONS

International Search Report and Written Opinioni for PCT Application No. PCT/US23/82728, mailed Mar. 13, 2024.

(Continued)

*Primary Examiner* — Charles M Swift
(74) *Attorney, Agent, or Firm* — McDonnell Boehnen Hulbert & Berghoff LLP

(57) ABSTRACT

Techniques for analyzing user activity relating to composite objects including at least a first object and a second object are described. The first object and the second object may be objects with respect to which a user, for example, a user in a communications network, can take various actions. Disclosed embodiments allow user activity relating to multiple objects to be analyzed by treating multiple objects as a composite object and generating an analysis of the user activity with respect to the composite object. The results of the analysis may provide an indication of whether the user activity corresponds to a given type of behavior occurring with respect to the composite object. For example, the results may indicate whether the user activity corresponds to manipulation of a status of the composite object or of one or more of the objects included in the composite object.

20 Claims, 10 Drawing Sheets

300

(51) Int. Cl.

| | |
|---|---|
| *G06F 11/34* | (2006.01) |
| *G06Q 30/02* | (2023.01) |
| *G06Q 30/0203* | (2023.01) |
| *H04L 67/50* | (2022.01) |

(52) U.S. Cl.
CPC .......... *G06F 11/3072* (2013.01); *G06F 11/34* (2013.01); *G06F 11/3438* (2013.01); *G06F 11/3495* (2013.01); *G06Q 30/0203* (2013.01); *H04L 67/50* (2022.05); *H04L 67/535* (2022.05)

(58) Field of Classification Search
CPC ............. G06F 11/3438; G06F 11/3495; G06Q 30/0203; H04L 67/50; H04L 67/535
See application file for complete search history.

(56) References Cited

U.S. PATENT DOCUMENTS

| | | | | |
|---|---|---|---|---|
| 2004/0098485 | A1 | 5/2004 | Larson et al. | |
| 2005/0055399 | A1 | 3/2005 | Savchuk | |
| 2005/0183143 | A1 | 8/2005 | Anderholm et al. | |
| 2010/0082800 | A1 | 4/2010 | Wei et al. | |
| 2010/0293267 | A1 | 11/2010 | Ribak et al. | |
| 2012/0254333 | A1 | 10/2012 | Chandramouli et al. | |
| 2013/0097246 | A1 | 4/2013 | Zifroni et al. | |
| 2015/0033305 | A1 | 1/2015 | Shear et al. | |
| 2015/0081505 | A1 | 3/2015 | Co et al. | |
| 2015/0244732 | A1* | 8/2015 | Golshan ................ | H04L 63/145 726/24 |
| 2017/0004576 | A1 | 1/2017 | Cicero et al. | |
| 2017/0255347 | A1* | 9/2017 | Zawadzki ............... | H04L 67/10 |
| 2017/0286191 | A1* | 10/2017 | Israeli ................. | G06F 11/3452 |
| 2019/0121811 | A1 | 4/2019 | Cherukuri | |
| 2021/0256084 | A1 | 8/2021 | Marsh et al. | |
| 2022/0116415 | A1* | 4/2022 | Burgis .................... | H04L 67/51 |

OTHER PUBLICATIONS

Biondo, J., and Trinkaus, M. "Make Surveillance Smarter and Eliminate Blind Spots with TT Score," Trade Talk Blog, Trading Technologies, Jan. 18, 2018, retrieved from the Internet at: https://www.tradingtechnologies.com/blog/2018/01/18/make-surveillance-smarter-and-eliminate-blind-spots-with-tt-score/.

Biondo, J., and Trinkaus, M. "Supercharge Your Spoofing Surveillance with TT Score," Trade Talk Blog, Trading Technologies, Feb. 14, 2018, retrieved from the Internet at: https://www.tradingtechnologies.com/blog/2018/02/14/supercharge-your-spoofing-surveillance-with-tt-score/.

Cao, Y., Detecting Price Manipulation in the Financial Market, Mar. 28, 2014 Computational Intelligence for Financial Engineering & Economics (CIFEr), 2014 IEEE.

Complaint of U.S. Commodity Futures Trading Commission in Case 1:15-cv-09196, filed Oct. 19, 2015.

Complaint of U.S. Commodity Futures Trading Commission in Case 1:15-cv-09196, Exhibit A, filed Oct. 19, 2015.

Crichlow, 'An Introduction to Distributed and Parallel Computing', Prentice Hall, 1988.

Irisium Market Surveillance, Cinnober, retrieved from the Internet on Apr. 23, 2018: https://www.cinnober.com/solutions/irisium-market-surveillance.

Li, Xiao-Li, and Liu, Bing, "Learning from Positive and Unlabeled Examples with Different Data Distributions," Department of Computer Science, University of Illinois at Chicago.

Liu, et al. at the URL www.cs.uic.edu/-liub/NSF/PSC-IIS-0307239.html as "Learning from Positive and Unlabeled Examples" {see also Bing Liu, Yang Dai, Xiaoli Li, Wee Sun Lee and Philip Yu. "Building Text Classifiers Using Positive and Unlabeled Examples." Proceedings of the Third IEEE International Conference on Data Mining ICDM-03), Melbourne, Florida, Nov. 19-22, 2003.

Liu, et al. "Building Text Classifiers Using Positive and Unlabeled Examples," Department of Computer Science, University of Illinois at Chicago.

Russell, S., 'Artificial Intelligence a Modern Approach', Pearson Education, 2003.

Satran, R., "Spoofing or Just Fast Trading? Chicago Case Helps Unwrap Mystery," Financial Regulatory Forum, Reuters, Nov. 19, 2015, retrieved from the Internet at: http://blogs.reuters.com/financial-regulatory-forum/2015/11/19/spoofing-or-just-fast-trading-chicago-case-helps-unwrap-mystery/.

SMARTS Trade Surveillance System, Surveillance Solutions, NASDAQ, retrieved from the Internet on Apr. 23, 2018: http://business.nasdaq.com/market-tech/market-participants/SMARTS-trade-surveillance-sell-side.

Trade Surveillance Software System, Trillium Surveyor, retrieved from the Internet on Apr. 23, 2018: https://www.trim.com/surveyor/.

'Fair Value Accounting and Financial Stability': Enria 2004, Occasional Paper Series No. 1 3.

'Microstructure-based manipulation: Strategic behavior and performance of spoofing traders': Lee, 2013, Elsevier Journal of Financial Markets 16 (2013) 227 252.

'Distributed Denial of Services Attack Protection System with Genetic Algorithms on Hadoop Cluster Computing Framework': Mizukoshi, 2015, IEEE, 978-1-4799-7492.

Pandas User Guide, Merge, join, concatenate and compare, retrieved from the internet at <https://pandas.pydata.org/pandas-docs/dev/user_guide/merging.html#timeseries-friendly-merging>, retrieved on Dec. 7, 2022.

Pandas API reference, pandas.Interval.overlaps, retrieved from the internet at <https://pandas.pydata.org/pandas-docs/stable/reference/api/pandas.Interval.overlaps.html>, retrieved on Dec. 7, 2022.

Wikipedia entry, Region growing, retrieved from the internet at <https://en.wikipedia.org/wiki/Region_growing>, retrieved on Dec. 7, 2022.

Tavakoli, et al., "Clustering Time Series Data through Autoencoder-based Deep Learning Models," arXiv:2004.07296v1 [cs.LG], Apr. 11, 2020.

* cited by examiner

100

300

402

First set of event
reports

404

Second set of
event reports 410   411 time

420 time

421

430    411

421 time

500 perform a clustering process with respect to the events of the list of events — 502 analyze the clusters to generate the analysis of user activity with respect to the composite object — 504

Features
650

Model
660

Output
670

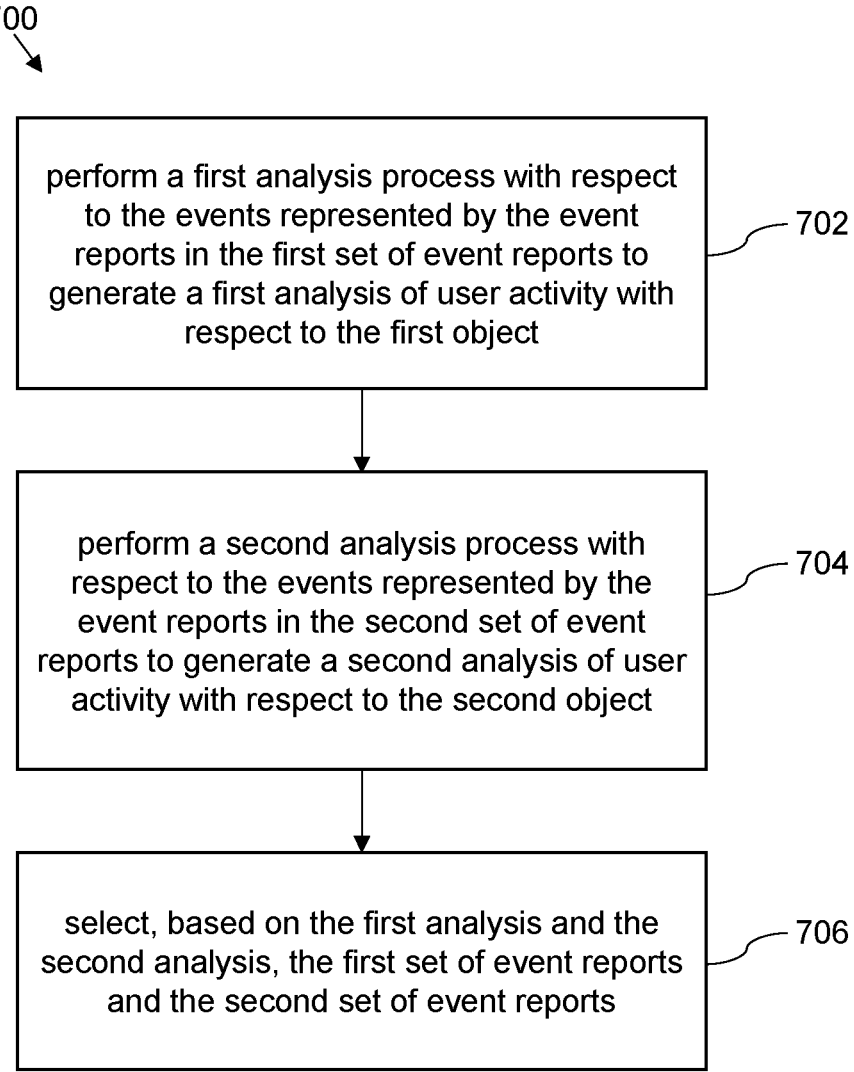

700 perform a first analysis process with respect to the events represented by the event reports in the first set of event reports to generate a first analysis of user activity with respect to the first object — 702 perform a second analysis process with respect to the events represented by the event reports in the second set of event reports to generate a second analysis of user activity with respect to the second object — 704 select, based on the first analysis and the second analysis, the first set of event reports and the second set of event reports — 706

First set of
event reports

804

Second set of
event reports

806

Third set of
event reports

808

Fourth set of
event reports

810

812        814        816        818

811

820

822        824        826

821

832        834

900

ANALYZING USER ACTIVITY WITH RESPECT TO A COMPOSITE OBJECT

BACKGROUND

In a system, such as a communications network, users may take actions with respect to objects. Data regarding such user activity may be gathered for the purpose of analyzing the user activity. The user activity may, for example, be analyzed to determine if it corresponds with certain types of behavior. In some examples, this analysis may be used to determine if any further action should be taken, for example, to further investigate the user activity or to provide an alert that a given type of behavior has occurred.

BRIEF DESCRIPTION OF THE DRAWINGS

Certain embodiments are disclosed with reference to the following drawings.

FIG. 7 is a flow diagram showing an example of a selection process for selecting a first set of event reports and a second set of event reports for generating a list of events occurring with respect to a composite object.

Figure 1:
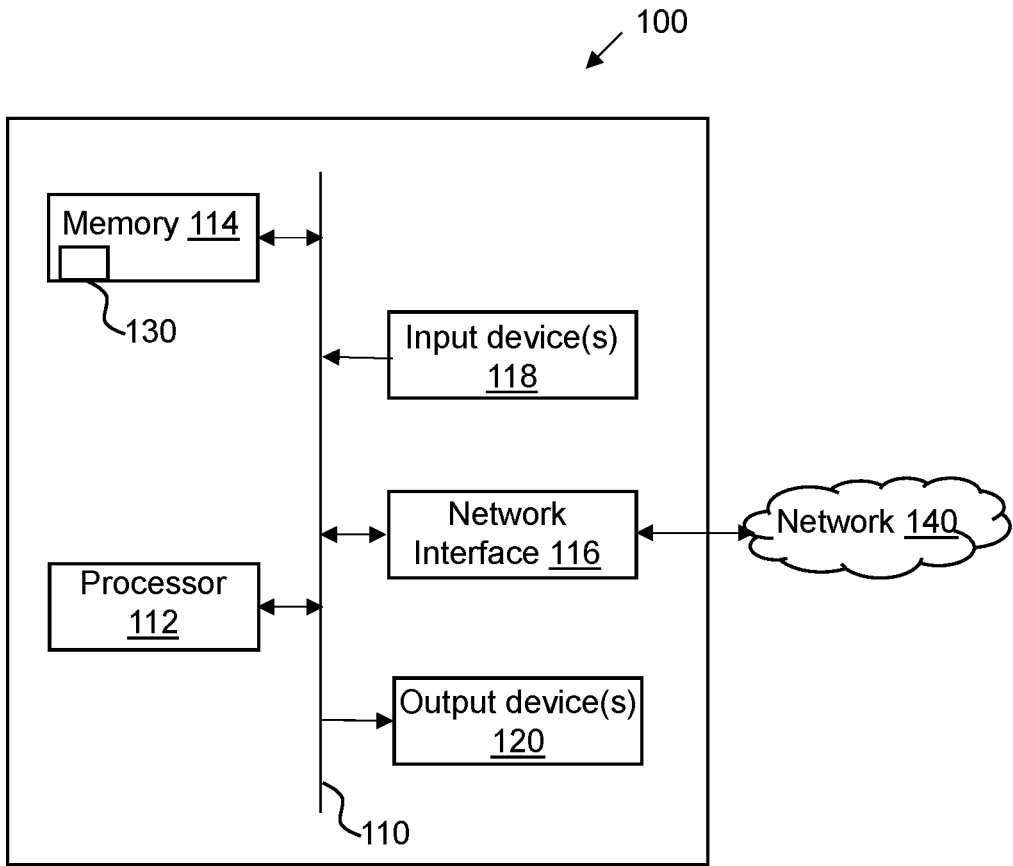
FIG. 1 is a block diagram showing a computing device according to certain embodiments.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

The disclosed embodiments generally relate to techniques for analyzing user activity relating to composite objects including at least a first object and a second object. For example, the first object and the second object may be objects with respect to which a user, for example, a user in a communications network, can take various actions, such as sending messages to manipulate the object or to store data associated with the object and the user. Instances of user activity may be recorded in respective event reports. User activity with respect to a single object can be analyzed by analyzing events occurring with respect to that object. However, in some examples, user activity may relate to more than one object. For example, user activity may occur with respect to related objects. A first object and a second object may, for example, be related such that a status of one of the objects can influence a status of the other.

Disclosed embodiments allow user activity relating to multiple objects to be analyzed by treating multiple objects as a composite object and generating an analysis of the user activity with respect to the composite object. This enables types of user activity which may not be analyzable by analyzing only events occurring with respect to one or the other of the first object and the second object to be analyzed. User activity relating to a composite object may be referred to herein as composite user activity. The results of the analysis may provide an indication of whether the user activity corresponds to a given type of behavior occurring with respect to the composite object. For example, the results of the analysis of the user activity with respect to the composite object may indicate whether the user activity corresponds to manipulation of a status of the composite object or one or more of the objects included in the composite object.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

BRIEF DESCRIPTION OF CERTAIN EMBODIMENTS

Certain embodiments provide a method including: obtaining, by a computing device: a first set of event reports, wherein each event report in the first set of event reports represents a respective event occurring with respect to a first object. The method further includes, obtaining, by the computing device, a second set of event reports, wherein each event report in the second set of event reports represents a respective event occurring with respect to a second object different from the first object. The method further includes, generating, by the computing device and using the first set of event reports and the second set of event reports, a list of events occurring with respect to a composite object including the first object and the second object. Further, the method includes generating, by the computing device and using the list of events, an analysis of user activity with respect to the composite object by performing an analysis process with respect to the events in the list of events. These features allow the first object and the second object to be treated as a composite object. This allows the composite object to be analyzed to generate an analysis of composite user activity relating to the composite object. Effective analysis of user activity involving activity across multiple objects may therefore be provided.

In certain embodiments, the event reports in the first set of event reports and the event reports in the second set of event reports are indicative of respective times of occurrence of the events represented by the event reports in the first set of event reports and the event reports in the second set of event reports and the generating the list of events includes ordering the events based on the respective times of occurrence of the events. This may allow for the list of events to represent a time-ordered series of events. This may allow for analysis of user activity to be generated taking into account the order in which and the time at which the events occurred.

In certain embodiments, the analysis process includes: performing a clustering process with respect to the events in the list of events to generate one or more clusters of events; and analyzing the clusters to generate the analysis of the user activity with respect to the composite object. This may allow for units of user activity to be identified which may be analyzed to generate the analysis of the user activity with respect to the composite object.

In certain embodiments, the clustering process includes generating the one or more clusters of events based on respective times of occurrence of the events. This may allow for the clusters to represent time-contiguous units of user activity.

In certain embodiments, the analysis of the clusters includes: performing a classification process to determine respective classifications of the one or more clusters of events, wherein a given classification of a given cluster of events is indicative of an estimation of whether the given cluster of events represents a given type of user activity. Classifying the clusters may allow for the analysis generated by the method to be provided in terms of an indication of whether a given cluster represents the given type of user activity. Accordingly, a viewer inspecting the analysis may, for example, identify clusters of behavior which are of interest for further investigation.

In certain embodiments, the classification process includes: computing respective features of the one or more clusters of events; and determining the respective classifications of the one or more clusters of events based on their respective features by use of a classification model. This allows that the clusters are evaluated and classified in a flexible and accurate way based on a model which may be configured to determine whether a cluster represents a given type of user behavior. For example, machine learning and/or rules-based algorithms may be used to classify a cluster.

In certain embodiments, the clustering process is based on a given type of the analysis of the user activity to be generated and the analysis of the clusters includes analyzing the clusters based on the given type of the analysis of the user activity. One or more features of the analysis process may be based on a given type of the analysis of the user activity to be generated. This allows for different types of user behavior to be detected by different applications of an analysis process having different respective features.

In certain embodiments, the method includes performing a selection process to select, from a plurality of sets of event reports including the first set of event reports and the second set of event reports, the first set of event reports and the second set of event reports for the obtaining and the generating the list of events. In certain embodiments, the selection process includes: performing a first analysis process with respect to the events represented by the event reports in the first set of event reports to generate a first analysis of user activity with respect to the first object; performing a second analysis process with respect to the events represented by the event reports in the second set of event reports to generate a second analysis of user activity with respect to the second object; and selecting, based on the first analysis and the second analysis, the first set of event reports and the second set of event reports. This allows for the objects to be included in the composite object to be determined effectively. For example, the selection process may allow for objects which are related to one another, as indicated by the analyses of the user activity with respect to those objects, to be determined.

In certain embodiments, the first analysis process includes performing a clustering process with respect to the events represented by the event reports in the first set of event reports to generate a first set of clusters of events and the second analysis process includes performing a clustering process with respect to the events represented by the event reports in the second set of event reports to generate a second set of clusters of events. In such embodiments, the selecting of the first set of event reports and the second set of event reports is based on a comparison between one or more clusters of the first set of clusters and one or more clusters of the second set of second clusters. This allows for the selection process to take into account clusters of events with respect to the first object and the second object. For example, clusters of events which occur at overlapping times may be analyzed to determine if they represent related behavior across the first object and the second object.

In certain embodiments, the one or more clusters of the first set of clusters and the one or more clusters of the second set of clusters each span a respective time period. In certain embodiments, the comparison between the one or more clusters of the first set of clusters and the one or more clusters of the second set of clusters includes a determination of whether a respective time period of the one or more clusters of the first set of clusters overlaps in time with a respective time period of the one or more clusters of the second set of clusters. This allows for clusters which overlap with one another in time to be compared to one another to determine if they represent related behavior across the first object and the second object. For example, clusters of events which occur at overlapping times may be more likely to be related, and therefore the occurrence of such clusters may indicate that user activity across the first object and the second object is related.

In certain embodiments, the comparison between the one or more clusters of the first set of clusters and the one or more clusters of the second set of clusters includes: determining respective classifications of a given cluster of the first set of clusters and a given cluster of the second set of clusters which overlaps in time with the given cluster of the first set of clusters; and determining if the respective classification of at least one of the overlapping clusters satisfies a pre-determined criterion. This may allow for a determination to be made of whether overlapping clusters indicate that the user activity they represent is related. For example, if a cluster of events occurring with respect to the first object and a cluster of events occurring with respect to the second object overlap in time and at least one of them is classified as representing a given type of behavior, then this may provide an indication that the activity across both objects should be analyzed with respect to that type of behavior.

In certain embodiments, the events occurring with respect to the first object and the events occurring with respect to the second object are events occurring over a same pre-determined elapsed period. In certain embodiments, the pre-determined elapsed period is a period of fixed length or a period of a user activity session. In certain embodiments, the analysis of the user activity with respect to the composite object includes an indication of a likelihood that an estimation of whether the user activity corresponds to a particular user behavior. This allows for the analysis which is generated to represent an analysis of user activity over a particular time period of interest.

In certain embodiments, the first object and the second object are respective first and second tradable objects. In certain embodiments, the events represented by the event reports in the first set of event reports relate to orders on the first tradable object and the events represented by the event reports in the second set of event reports may relate to orders on the second tradable object. In certain embodiments, the given user behavior includes market manipulation behavior, such as spoofing, front-running or momentum ignition. This may allow for market manipulation behavior to be detected by the analysis of events relating to the composite object. Tradeable objects may be related to one another and therefore user activity with respect to one object may affect a status of another related object. In examples, the method allows for such activity to be analyzed by treating the tradeable objects as a composite object.

Certain embodiments provide a tangible computer-readable storage medium includes instructions that, when executed, cause a computing device to: obtain: a first set of event reports, wherein each event report in the first set of event reports represents a respective event occurring with respect to a first object; and a second set of event reports, wherein each event report in the second set of event reports represents a respective event occurring with respect to a second object different from the first object; generate, using the first set of event reports and the second set of event reports, a list of events occurring with respect to a composite object including the first object and the second object; and generate, using the list of events, an analysis of user activity with respect to the composite object by performing an analysis process with respect to the events in the list of events.

Certain embodiments provide a computing device which includes: a report obtainer to obtain: a first set of event reports, wherein each event report in the first set of event reports represents a respective event occurring with respect to a first object; and a second set of event reports, wherein each event report in the second set of event reports represents a respective event occurring with respect to a second object different from the first object; a list generator to generate, using the first set of event reports and the second set of event reports, a list of events occurring with respect to a composite object including the first object and the second object; and an analyzer to generate, using the list of events, an analysis of user activity with respect to the composite object by performing an analysis process with respect to the events in the list of events.

EXAMPLE COMPUTING DEVICE

FIG. 1 illustrates a block diagram of an example computing device 100. The computing device 100 may be used to implement certain embodiments described herein. In other examples, other computing devices may be used. The computing device 100 includes a communication bus 110, a processor 112, a memory 114, a network interface 116, an input device 118, and an output device 120. The processor 112, memory 114, network interface 116, input device 118 and output device 120 are coupled to the communication bus 110. The computing device 100 is connected to an external network 140, such as a local area network (LAN) or a wide area network (WAN), like the Internet. The computing device is connected to the external network 140 via the network interface 116. The computing device 100 may include additional, different, or fewer components. For example, multiple communication buses (or other kinds of component interconnects), multiple processors, multiple memory devices, multiple interfaces, multiple input devices, multiple output devices, or any combination thereof, may be provided. As another example, the computing device 100 may not include an input device 118 or output device 120. As another example, one or more components of the computing device 100 may be combined into a single physical element, such as a field programmable gate array (FPGA) or a system-on-a-chip (SoC).

The communication bus 110 may include a channel, electrical or optical network, circuit, switch, fabric, or other mechanism for communicating data between components in the computing device 100. The communication bus 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, FPGAs, analog circuits, digital circuits, programmed processors, and/or combinations thereof, for example. The processor 112 may be a multi-core processor, which may include multiple processing cores of the same or different type. The processor 112 may be a single device or a combination of devices, such as one or more devices associated with a network or distributed processing system. The processor 112 may support various processing strategies, such as multi-processing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication bus 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network 140. The processor 112 may execute the logic to perform the functions, acts, or tasks described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include cache memory, local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein.

The memory 114 may store an application 130 implementing the disclosed techniques. In certain embodiments, the application 130 may be accessed from or stored in different locations. The processor 112 may access the application 130 stored in the memory 114 and execute computer-readable instructions included in the application 130.

The network interface 116 may include one or more network adaptors. The network adaptors may be wired or wireless network adaptors. The network interface 116 may allow communication by the computing device 100 with an external network 140. The computing device 100 may communicate with other devices via the network interface 116 using one or more network protocols such as Ethernet, Internet Protocol (IP), Transmission Control Protocol (TCP), User Datagram Protocol (UDP), wireless network protocols such as Wi-Fi, Long Term Evolution (LTE) protocol, or other suitable protocols.

The input device(s) 118 may include a positional input device, such as a mouse, touchpad, touchscreen, or the like; a keyboard, button, switch, or the like; and/or other human and machine interface devices. The output device(s) 120 may include a display, which can be a liquid crystal display (LCD), a cathode-ray tube (CRT), a light emitting diode (LED) display (such as an OLED display), or other suitable display.

In certain embodiments, during an installation process, the application may be transferred from the input device 118 and/or the network 140 to the memory 114. When the computing device 100 is running or preparing to run the application 130, the processor 112 may retrieve the instructions from the memory 114 via the communication bus 110.

EXAMPLE APPARATUS AND METHOD FOR ANALYZING USER ACTIVITY

Figure 2:
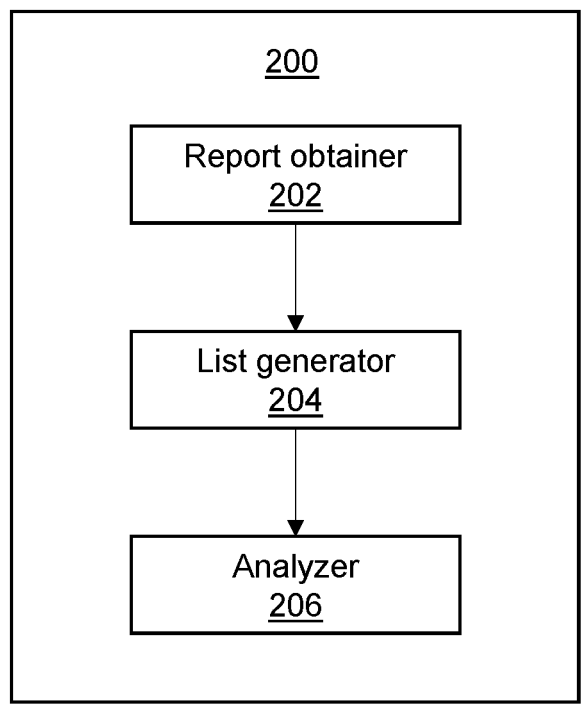
FIG. 2 is a block diagram showing a computing device for performing an example method for analyzing user activity.

FIG. 2 is a block diagram showing an example computing device 200. The computing device 200 may have any of the features of the computing device 100 described above. The computing device 200 includes a report obtainer 202, a list generator 204 and an analyzer 206. The computing device 200 is operable to perform a method of analyzing user activity.

Figure 3:
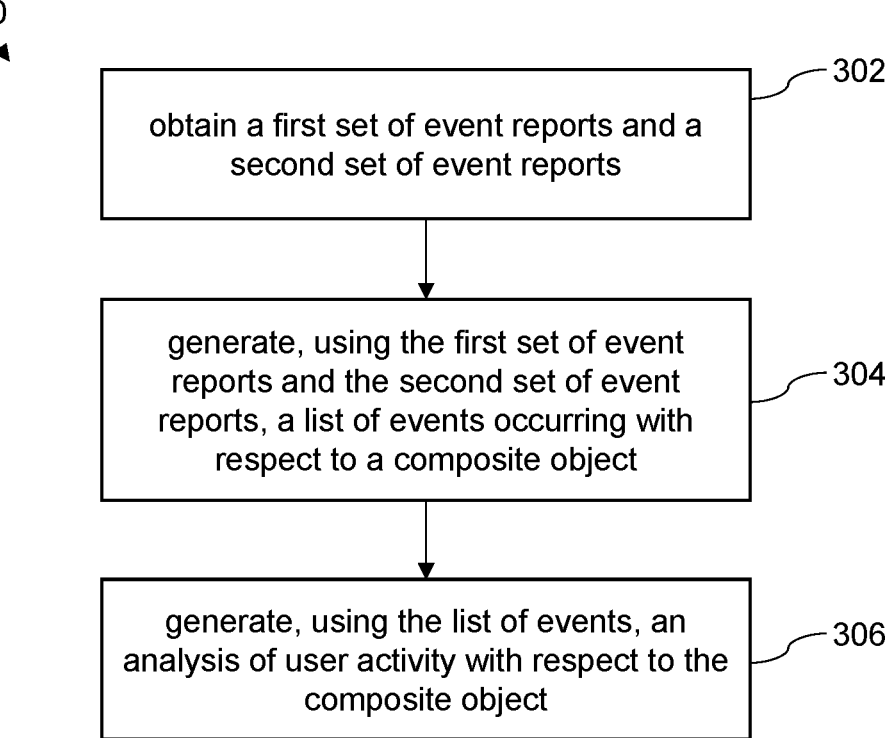
FIG. 3 is a flow diagram showing an example method for analyzing user activity.

FIG. 3 is a flow diagram showing an example method 300 of analyzing user activity which is performed by the computing device 200.

The method 300 includes, at block 302, obtaining, by the report obtainer 202: a first set of event reports and a second set of event reports. Each event report in the first set of event reports represents a respective event occurring with respect to a first object. Each event report in the second set of event reports represents a respective event occurring with respect to a second object different from the first object. The first object and the second object may be objects with respect to which various types of user activity may occur. For example, the first object and the second object may be objects with respect to which a user in a network, such as a communications network, can take various actions. A given event report records details of an event. The event may involve a user action or may not involve a user action. For example, an event may occur due to actions of a third party in the network, rather than due to a user whose activity is being analyzed. The details of the event recorded by an event report may include one or more of a type of the event, time of occurrence of the event, an identity of a user to whom the event relates, an identity of the object to which the event relates and any further details relating to the event.

In some examples, the user activity represented by the events recorded in the event reports of the first set of event reports and the second set of event reports is activity by a same single user. However, in other examples, the user activity may include activity of different users. For example, the user activity may include the activity of a plurality of users forming a given group of users. In some such examples, the events occurring in relation to the first object and the events occurring in relation to the second object may be events relating to different users. The user activity may include activity of one or more human users. Alternatively, or additionally, the user activity may include activity of one or more machine users.

In some examples, the first set of event reports and the second set of event reports relate to events occurring over a same pre-determined elapsed period. As such, the method 300 may allow for user activity over the pre-determined elapsed period to be analyzed. For example, the events may be events occurring over a pre-determined elapsed period of fixed length or a pre-determined period of a given user activity session. In one example, the period may be an elapsed 24-hour period, for example, a 24-hour period immediately preceding the obtaining of the first set of event reports and the second set of event reports.

The method 300 also includes, at block 304, generating, by the list generator 204 and using the first set of event reports and the second set of event reports, a list of events occurring with respect to a composite object including the first object and the second object. Generating the list of events may include extracting the events represented by the first set of event reports and the second set of event reports and generating the list of events from the extracted events. Where the event reports indicate a time of occurrence of the event to which the event reports relate, in some examples, generating the list of events includes generating a timeline of events. For example, the events represented by the event reports of the first set of event reports and the events represented by the event reports of the second set of event reports may be arranged as a time-ordered series. This arranging of the events into a time-ordered series may, for example, be implemented using a merge sort algorithm to sort the events based on timestamps of the events. For example, the events may be arranged in ascending or descending time order in the list of events. Arranging the list of events as a time-ordered series may allow for the events to be analyzed taking into account the time order in which they occurred, which may allow for patterns of user activity to be detected effectively.

The method 300 also includes, at block 306, generating by the analyzer 206 and using the list of events, an analysis of user activity with respect to the composite object by performing an analysis process with respect to the events in the list of events. The features of the analysis process may depend on the type of analysis of the user activity to be generated. For example, the analysis of the user activity may involve determining an estimation of whether the user activity corresponds to a given type of user behavior, and the features of the analysis process may vary depending on the given type of user behavior. Examples of an analysis process performed on a list of events occurring with respect to a composite object are described in more detail below.

The composite object may include one or more further objects in addition to the first object and the second object. In such examples, respective further sets of event reports may be obtained, at block 302, in addition to the first set of event reports and the second set of event reports. The one or more further objects may, for example, be objects which are related to one or both of the first object and the second object. Accordingly, in such examples, it may be advantageous for the composite object to include the one or more further objects, such that the analysis of the composite object provides an analysis of the composite user activity relating to the one or more related objects.

In some examples, the first object and the second object may be selected for inclusion in the composite object due to pre-determined factors, such as it being known that the first object and the second object are related to one another. In other examples, the method 300 includes performing a selection process to select, from a plurality of sets of event reports including the first set of event reports and the second set of event reports, the first set of event reports and the second set of event reports. In some examples, as will described in more detail below, the method 300 includes selecting the first set of event reports and the second set of event reports.

EXAMPLE OF GENERATING A LIST OF EVENTS RELATING TO A COMPOSITE OBJECT

Figures 4A, 4B, 4C:
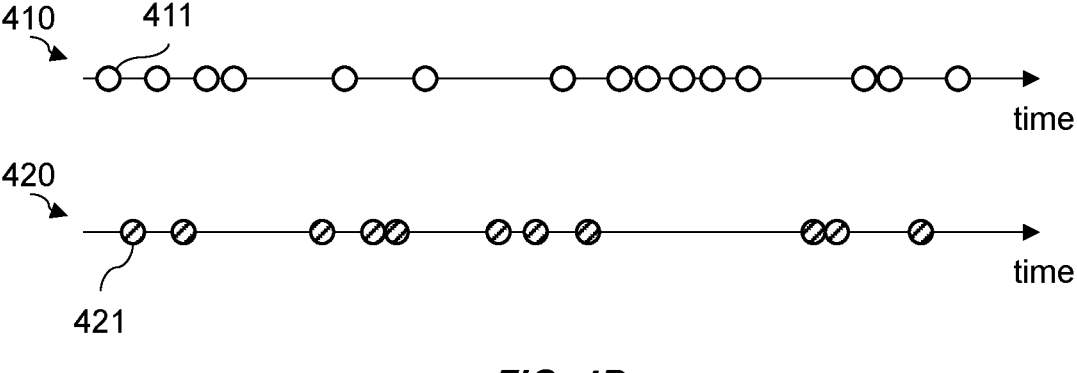
FIG. 4A is a schematic drawing showing an example of a first set of event reports and a second set of event reports.
FIG. 4B is a schematic drawing showing a first set of events represented by the first set of event reports of FIG. 4A and a second set of events represented by the second set of event reports of FIG. 4A.
FIG. 4C is a schematic drawing showing an example of a list of events including the first set of events and the second set of events shown in FIG. 4B.

FIGS. 4A, 4B and 4C show, by way of example, an implementation of blocks 302 and 304 of the method 300.

FIG. 4A is a block diagram showing a first set of event reports 402 including event reports relating to events occurring with respect to a first object and a second set of event reports 404 including event reports relating to events occurring with respect to a second object.

FIG. 4B is a schematic drawing showing a first set of events 410 represented by the event reports of the first set of event reports 402 and a second set of events 420 represented by the event reports of the second set of event reports 404. The first set of events 410 includes first events 411 (only a first event of which is labeled, for clarity) while the second set of events 420 includes second events 421 (where, similarly, only a first event of which is labeled, for clarity). FIG. 4B shows the first set of events 410 and the second set of events 420 each arranged as a time-ordered series, with time increasing along the horizontal axis from left to right. The timelines of the first set of events 410 and the second set of events 420 are aligned, such that equal horizontal positions on the timelines represent equal times of occurrence.

FIG. 4C is a schematic drawing showing a list of events 430 relating to a composite object including the first object and the second object. The list of events 430 has been generated, by the computing device, based on the obtained first set of event reports 402 and second set of event reports 404. In particular, the list of events 430 may be generated by merging the two time-ordered series of FIG. 4B into a single time-ordered list 430 including the first events 411 and the second events 421.

EXAMPLE ANALYSIS PROCESS

Figure 5:
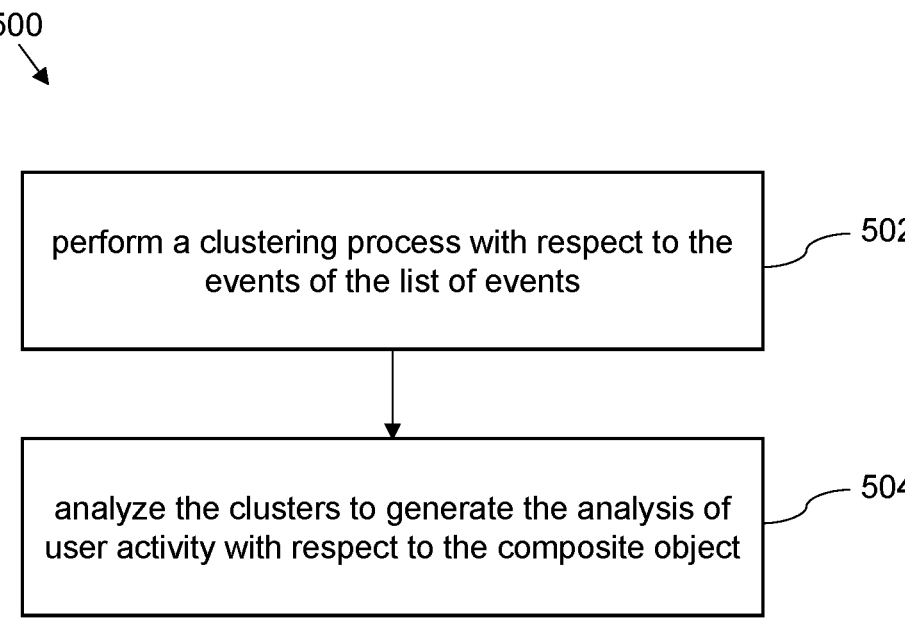
FIG. 5 is a flow diagram showing an example of an analysis process performed with respect to a list of events occurring with respect to a composite object.

FIG. 5 is a flow diagram showing an example analysis process 500 performed on a list of events relating to a composite object, such as the list of events 430 shown in FIG. 4C. The analysis process 500 is an example of the analysis process which is performed at block 306 of the method 300 of FIG. 3.

At block 502, the analysis process 500 includes performing a clustering process with respect to the events of the list of events 430. The clustering process generates one or more clusters each including one or more events. A given cluster may represent a set of related events occurring with respect to a given object which can be analyzed to provide an analysis of user activity with respect to the object. For example, a cluster may represent, in terms of a contiguous set of related events, a minimal level of user activity which can be analyzed to identify a particular characteristic of the user activity, such as a given behavior.

The features of the clustering process may depend on the type of analysis of the user activity to be generated. For example, the features of the clustering process may differ depending on the type of user behavior to be identified. Moreover, features of the clustering process may differ depending on factors such as the identity of the object to which the clustering process is to be applied. For example, different types of user behavior may typically occur over different timescales, involve different numbers of user-initiated events, or involve different time intervals between events. Similarly, the characteristics of user activity corresponding to a given type of user behavior may vary depending on the object to which the behavior relates. Accordingly, the clustering process may operate differently depending on the type of user behavior to be detected, to account for typical features of clusters of events which correspond to the behavior to be detected.

The clustering process may include generating one or more clusters based on respective times of occurrence of the events. The clustering process may operate to group events which may be related to one another, for example, due to their proximity in time. Clusters may vary in duration and in the number of events included in a cluster. For example, clusters may vary in duration from a fraction of a second to one or more minutes, and the number of events in a cluster may vary from one event to one hundred or more events.

In some examples, features of the events other than their respective times of occurrence are taken into account in the clustering process. For example, one or more statistical measures of the events forming a candidate cluster may be compared to a threshold to determine whether the candidate cluster should be accepted or rejected as a cluster to be analyzed.

In some examples, the clustering process may involve applying a window function to the time-ordered series of events. Application of the window function may involve counting a number of consecutive events and measuring properties of one or more consecutive events. This may allow for candidate clusters to be generated which can be evaluated against one or more criteria to determine whether to accept or reject a given candidate cluster as a cluster to be analyzed. An example of this is described in more detail with reference to FIG. 6A.

In some examples, the clustering process is deterministic and is based on the application of one or more rules-based algorithms. In other examples, the clustering process may involve the application of a trained machine learning model to the list of events.

At block 504, the analysis process 500 includes analyzing the clusters to generate the analysis of the user activity with respect to the composite object.

In some examples, analyzing the clusters includes performing a classification process on clusters generated by the clustering process to generate respective classifications of the clusters. A given classification of a given cluster may be indicative of an estimation of whether the given cluster represents a given type of user activity.

The classification process may include computing features of a given cluster to be provided to a classification model. The classification model may then take the features of a cluster as an input and provide the classification of the cluster as an output. The classification model may, for example, include a machine learning model. The classification model may, alternatively, or additionally, include one or more rules-based algorithms.

In a similar manner to that described above for the clustering process, clusters may be analyzed in a different way depending on the type of analysis to be generated. For example, during the analysis of a cluster, the features which are computed and the classification model which is used may differ depending on the type of analysis to be generated.

As an example, the analysis of user activity generated by the analysis process 500 may include an indication that user activity with respect to the composite object corresponds to a given type of behavior intended to manipulate a status of one or more of the objects included in the composite object. In such an example, the clustering process operates to identify clusters of events relating to the composite object which may be relevant to the given type of manipulation behavior. Similarly, the analysis of the clusters involves computing features which allow an estimation of whether the cluster corresponds to the given type of manipulation behavior to be determined and classifying the clusters based on those features.

In some examples, the analysis process involves determining an estimate of a probability that a given cluster would be labeled as corresponding to a given type of behavior. For example, one or more clusters of activity may have been previously labeled, for example, by a human expert, as corresponding to a given type of behavior. During the analysis process, a probability that the given cluster being analyzed would be labeled by the human expert as corresponding to the given type of behavior may be estimated. For example, the probability may be estimated by inputting the computed features of the given cluster into a model which provides the probability as an output. In some such examples, the model may be a machine learning model which has been trained on the expert-labeled clusters. In other examples, the model may be a deterministic, rules-based model. The probability value may form part of the analysis of user activity which is output by the method.

EXAMPLE OF ANALYZING A LIST OF EVENTS RELATING TO A COMPOSITE OBJECT

Figures 6A, 6B:
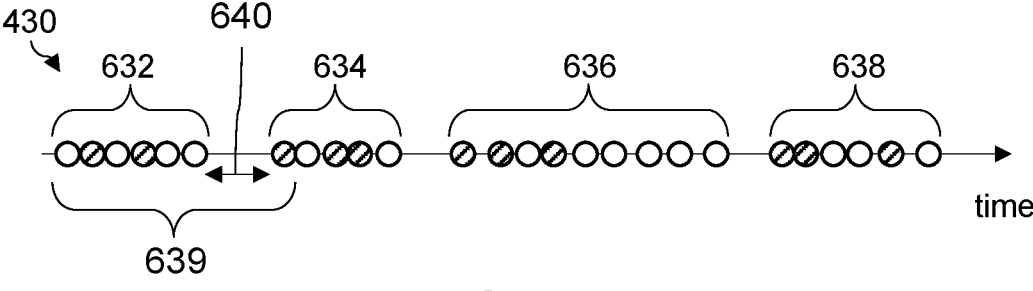
FIG. 6A is a schematic drawing showing an example of clusters of events generated as part of an analysis process performed on the list of events shown in FIG. 4B.
FIG. 6B is a schematic drawing showing aspects of an example method of analyzing an example cluster of the clusters shown in FIG. 6A.

FIGS. 6A and 6B show, by way of example, an implementation of the example analysis process 500. FIG. 6A is a schematic diagram showing an example of a clustering process performed with respect to the events 411, 421 of the list of events 430 shown in FIG. 4C.

FIG. 6A shows a first cluster 632, a second cluster 634, a third cluster 636 and a fourth cluster 638, each having been generated by a clustering process performed with respect to the events of the list of events 430 of FIG. 4C. In this example, the clustering process used to generate the clusters 632, 634, 636, 638 includes identifying clusters based on a times of occurrence of the events in the list 430. In particular, each of the clusters 632, 634, 636, 638 includes a series of time-contiguous events. In this example, the clusters 632, 634, 636, 638 are formed such that a time interval between consecutive events in a given cluster is not greater than a pre-determined time interval. A cluster may be determined as a longest consecutive series of events, in terms of the number of events in the series, wherein each event in the series is separated from consecutive events in the series by less than the pre-determined time interval.

The clusters 632, 634, 636, 638 may be generated by forming candidate clusters and evaluating those candidate clusters such that a candidate cluster is only selected as a cluster to be analyzed if the candidate cluster represents a longest contiguous series of events which is such that a time interval between each event in the candidate cluster is less than a pre-determined interval. For example, FIG. 6A illustrates how the first cluster 632 has been generated by determining that the first six events in the list 430 form a longest series of events wherein the interval between the events is less than a pre-determined interval.

To further illustrate this process, a candidate cluster 639 is shown which has been generated and evaluated as part of the process, but which has not been selected as one of the clusters 632, 634, 636, 638 to be analyzed. The candidate cluster 639 includes the six events of the first cluster 632 and, additionally, an event of the second cluster 634. The event of the second cluster 634 which is included in the candidate cluster 639 is the earliest occurring event in the second cluster 634. Each of the events in the first cluster 632 occurs within a pre-determined time interval of the preceding event. However, a time interval 640 between the latest event in the first cluster 632 and the earliest event in the second cluster 634 exceeds the pre-determined time interval. The candidate cluster 639 is therefore rejected as a cluster to be analyzed while a candidate cluster including only the events in the first cluster 632 is selected as the first cluster 632. Once the first cluster 632 is generated, the clustering process continues to determine the next series of consecutive events which are separated from one another by less than the pre-determined time interval, and thereby identifies the second cluster 634. The clustering process proceeds in this manner, generating and assessing candidate clusters, to generate the third cluster 636 and the fourth cluster 638.

FIG. 6B shows an example implementation of block 504 of the analysis process 500 performed with respect to the third cluster 636. FIG. 6B shows a set of features 650 of a given cluster of the clusters 632, 634, 636, 638 of FIG. 6A. In this example, the set of features 650 represents features of the third cluster 636. The features of the third cluster 636 may include, for example, statistical features of the cluster, such as the number of events in the cluster, the average time interval between events in the cluster or the total duration of the cluster. The features of the cluster 636 may also include features of the individual events in the cluster 636, such as a type of the events, or a status of the composite object following occurrence of a given event.

The set of features 650 are provided as input to a model 660. The model 660 provides as an output a classification

670 of the third cluster 636. The model 660 operates to generate the analysis of the user activity with respect to the composite object. In particular, the model 660 operates to generate an analysis of a given type of user activity with respect to the composite object.

Each of the other clusters 632, 634, 638 may be analyzed, in a similar way to that shown in FIG. 6B, to produce respective classifications of the other clusters 632, 634, 638. For each of the clusters 632, 634, 638, the steps 650, 660 and 670 are repeated, as shown in FIG. 6B, to provide respective classifications of those clusters. Together, the clusters 632, 634, 636, 638 and the classifications of the clusters may form the output 670 of the analysis process. For example, the output 670 may include details of the clusters of events 632, 634, 636, 638, including the events included in those clusters, and, in addition, classifications of the clusters 632, 634, 636, 638 which are indicative of an estimation that the clusters 632, 634, 636, 638 correspond to the given type of user behavior.

The output 670 provides an analysis of user activity with respect to the composite object. The output 670 may be provided to one or more users, who may include the user to which the user activity corresponds and/or one or more further users. For example, if the output 670 indicates that one or more clusters which have been analyzed are estimated to correspond to the given type of user behavior, then a user may be alerted of this.

SELECTING OBJECTS TO BE INCLUDED IN A COMPOSITE OBJECT

FIG. 7 is flow diagram showing an example selection process 700 for selecting objects, including a first object and a second object, to be included in a composite object. The selection process 700 may be performed as part of an example method according to FIG. 3. For example, the selection process 700 may be performed prior to block 302 to select the first object and the second object. Based on the outcome of the selection process 700, the method 300 may continue by obtaining the first set of event reports and the second set of event reports at block 302.

The selection process may, for example, be performed to identify one or more objects where user activity across those objects may be related. This may allow for an effective determination to be made of which objects should be included in a composite object. For example, the selection process may involve determining that a user exhibited a given behavior with respect to a first object at a similar time as the user taking actions with respect to a second object. If, for example, analysis of the user's behavior with respect to the first object indicates that the user may have been trying to manipulate a status of the first object, then the fact that the user was taking actions with respect to the second object at the same time may indicate that the activity is related. For example, it may be the case that the user activity corresponds to behavior intended to manipulate the status of both the first object and the second object. Accordingly, the first object and the second object can be treated as a composite object to allow for this type of related user activity across multiple objects to be analyzed.

The selection process may involve comparing user activity across multiple different combinations of objects to determine which objects may be related. Those objects with respect to which user activity is deemed to be related may be included in one or more respective composite objects to be analyzed. A more detailed example of the selection process is described below with respect to FIG. 8A and FIG. 8B.

In the selection process 700 of FIG. 7, at block 702, the selection process 700 a first analysis process is performed with respect to the events represented by the event reports in the first set of event reports to generate a first analysis of user activity with respect to the first object. The first analysis process may, for example, involve analyzing user activity with respect to the first object to estimate if clusters of activity represent a given type of user behavior, for example, a behavior involving manipulation of the status of the first object. The first analysis process may include any of the features described above in relation to the analysis process which is performed with respect to the events in the composite list of events. For example, the first analysis process may include performing a clustering process with respect to the events of the first set of event reports to generate one or more clusters, computing features of the one or more clusters and analyzing the clusters to generate the first analysis.

At block 704, the selection process 700 includes performing a second analysis process with respect to the events represented by the event reports in the second set of event reports to generate a second analysis of user activity with respect to the second object. Similar to the first analysis process, the second analysis process may include any of the features described above in relation to the analysis process which is performed with respect to the events in the composite list of events. The second analysis process may, for example, involve analyzing user activity with respect to the second object to estimate if clusters of the user activity correspond the same type of user activity which the first analysis process is configured to detect. For example, the second analysis process may include performing a clustering process with respect to the events represented by the event reports in the second set of event reports to generate a second set of clusters of events, computing features of the one or more clusters and analyzing the clusters to generate the second analysis.

At block 706, the selection process 700 includes selecting, based on the first analysis and the second analysis, the first set of event reports and the second set of event reports. The selecting which is performed at block 706 may include comparing one or more clusters generated from the events of the first set of event reports to one or more clusters generated from the events of the second set of event reports. For example, in some examples, the one or more clusters of the first set of clusters and the one or more clusters of the second set of clusters may each span a respective time period. The comparison between the one or more clusters of the first set of clusters and the one or more clusters of the second set of clusters may include a determination of whether a respective time period of the one or more clusters of the first set of clusters overlaps in time with a respective time period of the one or more clusters of the second set of clusters. For example, clusters of activity on different objects which overlap with one another may be analyzed to determine whether they indicate potentially related user activity across the different objects.

In some examples, the comparison between the one or more clusters of the first set of clusters and the one or more clusters of the second set of clusters includes: determining respective classifications of a given cluster of the first set of clusters and a given cluster of the second set of clusters which overlaps in time with the given cluster of the first set of clusters; and determining if the respective classification of at least one of the overlapping clusters satisfies a predetermined criterion. For example, the pre-determined criterion may be that the cluster is estimated to correspond to a given type of user behavior, such as a behavior involving manipulation of the status of one of the objects.

The classifications of the clusters may be determined in a similar manner to that described above for the clusters of the events in the list of events. For example, each cluster in the first set of clusters may be analyzed to determine a classification of that cluster. Similarly, each cluster in the second set of clusters may be analyzed to determine a classification of that cluster. Clusters of the first set of clusters which overlap with clusters of the second set of clusters may be determined. The classifications of any overlapping clusters may then be evaluated to determine if any one of them satisfies a pre-determined criterion. For example, as above, the pre-determined criterion may be that the given cluster has a classification which is indicative that the given cluster represents a given type of user behavior, such as a given behavior corresponding to manipulation of a status of one of the objects.

In some examples, if it is determined that at least one cluster in a group of overlapping clusters satisfies the pre-determined criterion, then this provides an indication that user activity on the first object and the second object is related. For example, if the analysis of a cluster of user activity with respect to the first object indicates that the user may have been trying to manipulate a status of the first object, then the fact that a cluster of user activity on the second object at the same time may indicate that the activity of the two overlapping clusters is related. Based on this indication, the first object and the second object may be selected for inclusion in the composite object such that composite user activity with respect to the related first object and second object can be analyzed. The user activity across the two related objects may then be analyzed as composite user activity, for example, to estimate if it corresponds to the given manipulative behavior.

In some examples, the comparison of the first set of clusters and the second set of clusters may involve evaluation with regards to further criteria. For example, a given set of overlapping clusters may be determined to indicate related user activity across the first object and the second object if all clusters in the set of overlapping clusters satisfy a given pre-determined criterion, such as a criterion indicating that the clusters relate to a given type of user activity. In another example, the comparison may be taken to be indicative of related activity across the first object and the second object if it is determined that more than one set of overlapping clusters are indicative of related user activity.

EXAMPLE OF SELECTING OBJECTS TO BE INCLUDED IN A COMPOSITE OBJECT

Figure 8A:
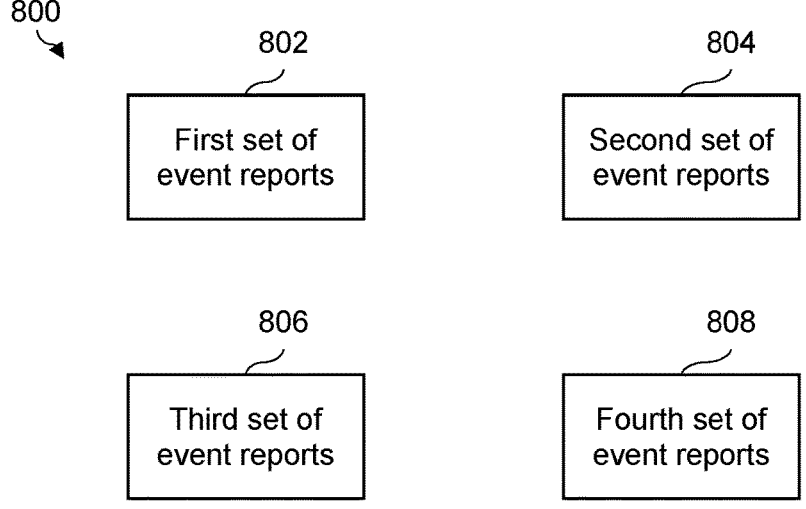
FIG. 8A is a schematic drawing showing a plurality of sets of event reports from which sets of event reports are selected by an example selection process.
Figure 8B:
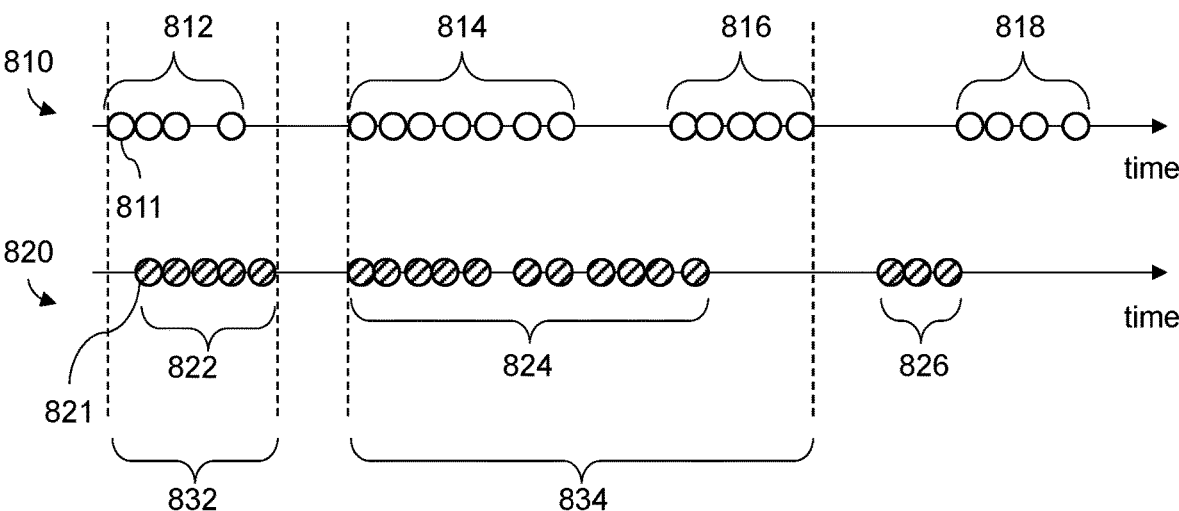
FIG. 8B is a block diagram showing aspects of an example selection process.

FIGS. 8A and 8B show an example method of selecting a first set of event reports and a second set of event reports. The example method shown in FIGS. 8A and 8B may, for example, be used to determine the first set of event reports and the second set of event reports to be obtained at block 302 in an example implementation of the method 300.

FIG. 8A is a schematic drawing showing a plurality of sets of event reports 800. The plurality of sets of event reports 800 includes a first set of event reports 802, a second set of event reports 804, a third set of event reports 806 and a fourth set of event reports 808. The sets of event reports 802, 804, 806, 808, include event reports representing events occurring with respect to respective first, second, third and fourth objects. In an example method, the sets of event reports are analyzed with respect to one another to determine if the objects to which they relate should be included in a composite object to be analyzed.

In the example shown in FIG. 8A and FIG. 8B the first set of event reports 802 and the second set of event reports 804 are selected. However, in other examples, two or more others of the sets 802, 804, 806, 808 may be selected. For example, if it is determined by the selection process that the first object and the third object should be included in a composite object, then the first set of event reports 802 and the third set of event reports 806 may be selected. The first set of event reports 802 and the second set of event reports 806 may then be obtained and used to generate an analysis of user activity with respect to the composite object, as has been described above with reference to the method 300 of FIG. 3. In other examples, if it is determined that three or more of the objects are related, then the composite object may include those three or more objects and the corresponding three or more sets of event reports for those objects are selected by the selection process.

FIG. 8B is a schematic drawing showing a first set of events 810 represented by the event reports of the first set of event reports 802 and a second set of events 820 represented by the second set of event reports 804. Similar to the example of FIG. 4B, the first set of events 810 includes first events 811 (only a first one of which is labeled, for clarity) while the second set of events 820 includes second events 821 (where, again, only a first event of the second set of events 420 is labeled, for clarity). The first set of events 810 and the second set of events 820 are each arranged as a time-ordered series, with time increasing from left to right. The timelines of the first set of events 810 and the second set of events 820 are aligned, such that equal horizontal positions on the timelines represent the same time of occurrence.

In this example the first set of events 810 includes four clusters: a first cluster 812, a second cluster 814, a third cluster 816 and a fourth cluster 818. The second set of events 820 includes three clusters: a first cluster 822, a second cluster 824 and a third cluster 826. The clusters 812, 814, 816, 818, 822, 824, 826 have been determined by a clustering process applied separately to the first set of events 810 and the second set of events 820. The clustering process has the same features as described above for the clustering process applied to the list of events 430. Namely, the clustering process may determine clusters of events relevant for analyzing a given type of user activity. The clusters 812, 814, 816 and 818 have been identified by the clustering process as clusters of events suitable for analyzing the given type of user activity with respect to the first object. Similarly, the clusters 822, 824, and 826 have been identified by the clustering process as clusters of events suitable for analyzing the given type of user activity with respect to the second object.

As part of the selection process, a set of overlapping clusters are determined. In this example, each cluster is determined to span a respective time period, which begins at the time of occurrence of the earliest event in the cluster and ends at the time of occurrence of the latest event in the cluster. Whether two or more clusters overlap may be determined by determining whether the respective time periods spanned by the clusters overlap. In the example shown in FIG. 8B, two overlapping sets of clusters have been determined. A first overlapping set of clusters 832 includes the first cluster 812 of events relating to the first object and the first cluster 822 of events relating to the second object. A second overlapping set of clusters 834 includes the second cluster 814 and third cluster 816 relating to the first object and the second cluster 824 relating to the second object. The fourth cluster 818 relating to the first object and the third cluster 826 relating to the second object each do not overlap with any other cluster and so do not form part of an overlapping set of clusters.

Also, as part of the selection process, the clusters are analyzed and classified with respect to the given type of user activity. For example, each of the clusters 812, 814, 816, 818 may be analyzed to estimate whether they correspond to a given type of user behavior with respect to the first object. Similarly, each of the clusters 822, 824 and 826 may be analyzed to estimate whether they correspond to a given type of user behavior with respect to the second object.

For each of the overlapping sets of clusters 832, 834 an analysis of the respective clusters in the overlapping set is used to generate an analysis of the overlapping sets. In an example, the respective classifications of the clusters 812, 822 in the first overlapping set 832 are analyzed to determine whether at least one of the classifications satisfied a predetermined criterion. For example, if at least one of the classifications of the clusters 812, 822 indicates that user activity with respect to the first object or the second object is user behavior of the given type, then an output is provided indicating that the first overlapping set indicates that user activity relating to the first object and the second object may be related and should be analyzed as composite user activity. Similarly, if at least one of the clusters 814, 816, 824 in the second overlapping set 834 indicates that user activity with respect to the first object or the second object is user behavior of the given type, then an output is provided indicating that the second overlapping set indicates that user activity relating to the first object and the second object may be related and should be analyzed as composite user activity.

As described above, in other examples, different or additional criterion may be used to determine based on the overlapping sets of clusters whether the first object and the second object should be included in the composite object. For example, overlapping clusters may only be taken to indicate related behavior across two objects where all of the overlapping clusters have been individually classified as corresponding to a given type of behavior.

EXAMPLE ELECTRONIC TRADING SYSTEM

Figure 9:
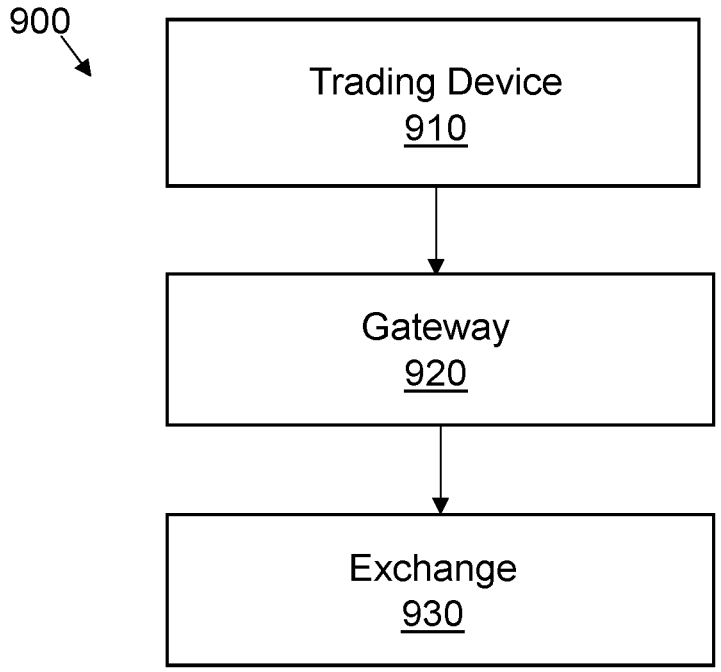
FIG. 9 is a block diagram showing an example of an electronic trading system in which certain embodiments may be employed.

FIG. 9 illustrates a block diagram representative of an example electronic trading system 900 in which certain embodiments may be employed. The system 900 includes a trading device 910, a gateway 920, and an exchange 930. The trading device 910 is in communication with the gateway 920. The gateway 920 is in communication with the exchange 930. As used herein, the phrase "in communication with" encompasses direct communication and/or indirect communication through one or more intermediary components. The trading device 910, the gateway 920 and/or the exchange 930 may include one or more computing devices 100 of FIG. 1. The exemplary electronic trading system 900 depicted in FIG. 9 may be in communication with additional components, subsystems, and elements to provide additional functionality and capabilities without departing from the teaching and disclosure provided herein.

In operation, the trading device 910 may receive market data from the exchange 930 through the gateway 920. The trading device 910 may send messages to the exchange 930 through the gateway 920. A user may utilize the trading device 910 to monitor the market data and/or base a decision to send an order message to buy or sell one or more tradeable objects to the exchange 930. The trading device 910 may use the market data to take trade actions such as to send an order message to the exchange 930. For example, the trading device may run an algorithm that uses the market data as input and outputs trade actions, such as to send an order message to the exchange 930. The algorithm may or may not require input from a user in order to take the trade actions.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 910 may include one or more electronic computing platforms. For example, the trading device 910 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 910 may include a single or multi-core processor in communication with a memory or other storage medium configured to accessibly store one or more computer programs, applications, libraries, computer readable instructions, and the like, for execution by the processor.

By way of example, the trading device 910 may include a computing device, such as a personal computer or mobile device, in communication with one or more servers, where collectively the computing device and the one or more servers are the trading device 910. For example, the trading device 910 may be a computing device and one or more servers together running TTR Platform, an electronic trading platform provided by Trading Technologies International, Inc. of Chicago Illinois ("Trading Technologies"). For example, the one or more servers may run one part of the TT platform, such as a part providing a web server, and the computing device may run another part of the TT platform, such as a part providing a user interface function on a web browser. The computing device and the server may communicate with one another, for example using browser session requests and responses or web sockets, to implement the TT platform. As another example, the trading device 910 may include a computing device, such as a personal computer or mobile device, running an application such as TT® Desktop or TT® Mobile, which are both electronic trading applications also provided by Trading Technologies. As another example, the trading device 910 may be one or more servers running trading tools such as ADL®, AUTOSPREADER® AUTOTRADER™, and/or MD TRADER®, also provided by Trading Technologies.

The trading device 910 may be controlled or otherwise used by a user. As used herein, the phrase "user" may include, but is not limited to, a human (for example, a trader), trading group (for example, a group of traders), or an electronic trading device (for example, an algorithmic trading system). One or more users may be involved in the control or other use of the trading device.

The trading device 910 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 910 from another computer readable medium. For example, the trading application (or updates to the trading application) may be stored by a manufacturer, developer, or publisher on one or more CDs, DVDs, or USB drives, which are then loaded onto the trading device 910 or to a server from which the trading device 910 retrieves the trading application. As another example, the trading device 910 may receive the trading application (or updates to the trading application) from a server, for example, via the Internet or an internal network. The trading device 910 may receive the trading application or updates when requested by the trading device 910 (for example, "pull distribution") and/or un-requested by the trading device 910 (for example, "push distribution").

The trading device 910 may be adapted to send order messages. For example, the order messages may be sent to through the gateway 920 to the exchange 930. As another example, the trading device 910 may be adapted to send order messages to a simulated exchange in a simulation environment which does not effectuate real-world trades.

The order messages may be sent at the request of a user. For example, a trader may utilize the trading device 910 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 910 to the exchange 930 through the gateway 920. The trading device 910 may communicate with the gateway 920 using a local area network, a wide area network, a multicast network, a wireless network, a virtual private network, an internal network, a cellular network, a peer-to-peer network, a point-of-presence, a dedicated line, the Internet, a shared memory system and/or a proprietary network.

The gateway 920 may include one or more electronic computing platforms. For example, the gateway 920 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 920 facilitates communication. For example, the gateway 920 may perform protocol translation for data communicated between the trading device 910 and the exchange 930. The gateway 920 may process an order message received from the trading device 910 into a data format understood by the exchange 930, for example. Similarly, the gateway 920 may transform market data in an exchange-specific format received from the exchange 930 into a format understood by the trading device 910, for example. As described in more detail below with reference to FIG. 10, in some examples, the gateway 920 may be in communication with cloud services, which may support functions of the gateway 920 and/or the trading device 910.

The gateway 920 may include a trading application, similar to the trading applications discussed above, that facilitates or improves electronic trading. For example, the gateway 920 may include a trading application that tracks orders from the trading device 910 and updates the status of the order based on fill confirmations received from the exchange 930. As another example, the gateway 920 may include a trading application that coalesces market data from the exchange 930 and provides it to the trading device 910. In yet another example, the gateway 920 may include a trading application that provides risk processing, calculates implieds, handles order processing, handles market data processing, or a combination thereof.

In certain embodiments, the gateway 920 communicates with the exchange 930 using a local area network, a wide area network, a multicast network, a wireless network, a virtual private network, an internal network, a cellular network, a peer-to-peer network, a point-of-presence, a dedicated line, the Internet, a shared memory system, and/or a proprietary network.

The exchange 930 may be owned, operated, controlled, or used by an exchange entity. Example exchange entities include the CME Group, the Chicago Board Options Exchange, the Intercontinental Exchange, and the Singapore Exchange. The exchange 930 may be an electronic exchange that includes an electronic matching system, such as a computer, server, or other computing device, which is adapted to allow tradeable objects, for example, offered for trading by the exchange, to be bought and sold. The exchange 930 may include separate entities, some of which list and/or administer tradeable objects and others which receive and match orders, for example. The exchange 930 may include an electronic communication network ("ECN"), for example.

The exchange 930 is adapted to receive order messages and match contra-side trade orders to buy and sell tradeable objects. Unmatched trade orders may be listed for trading by the exchange 930. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 910 or other devices in communication with the exchange 930, for example. For example, typically the exchange 930 will be in communication with a variety of other trading devices (which may be similar to trading device 910) which also provide trade orders to be matched.

The exchange 930 is adapted to provide market data. Market data may be provided in one or more messages or data packets or through a shared memory system. For example, the exchange 930 may publish a data feed to subscribing devices, such as the trading device 910 or gateway 920. The data feed may include market data.

The system 900 may include additional, different, or fewer components. For example, the system 900 may include multiple trading devices, gateways, and/or exchanges. In another example, the system 900 may include other communication devices, such as middleware, firewalls, hubs, switches, routers, servers, exchange-specific communication equipment, modems, security managers, and/or encryption/decryption devices.

SPECIFIC EXAMPLE ELECTRONIC TRADING SYSTEM

Figure 10:
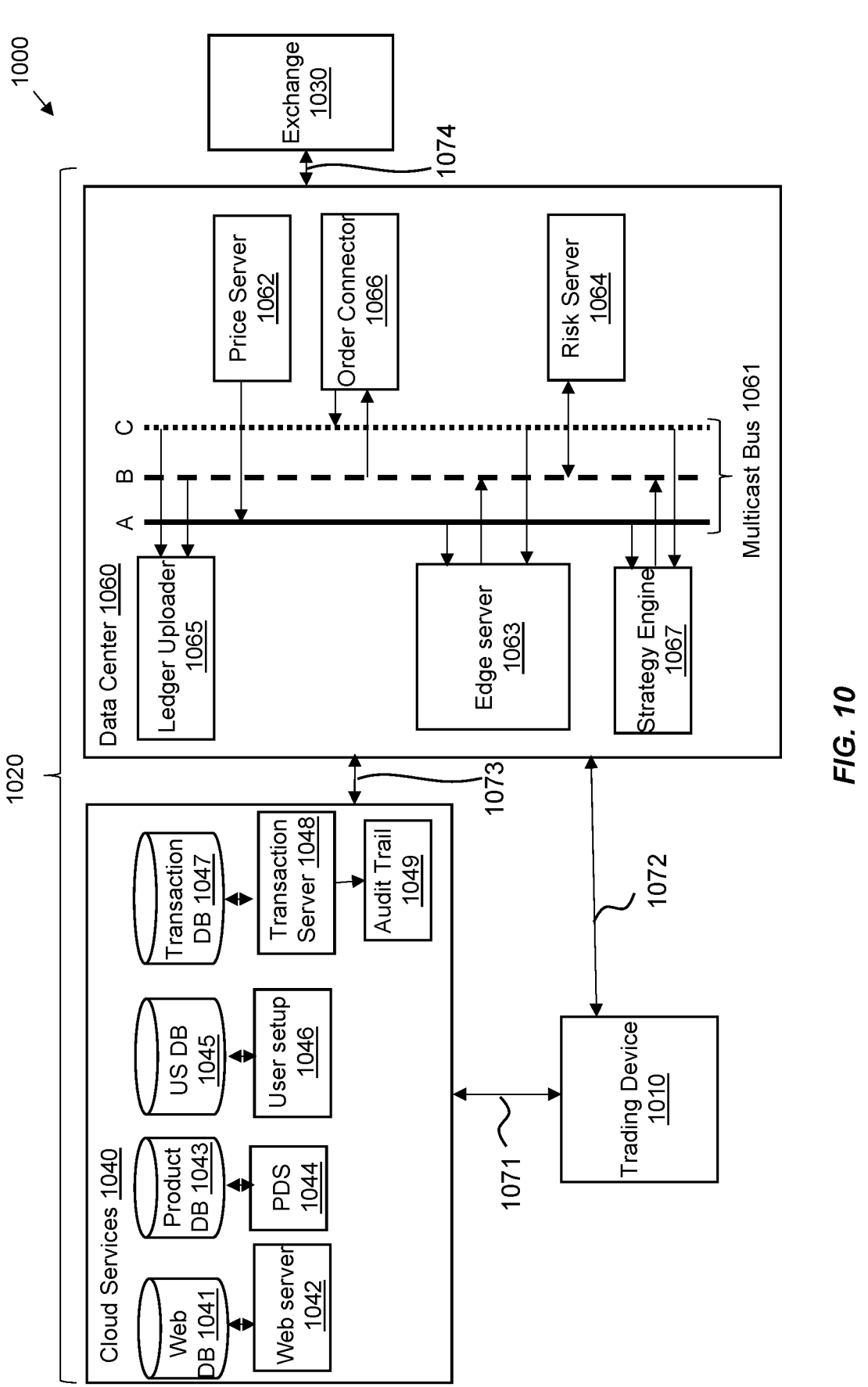
FIG. 10 is a block diagram showing an example of an electronic trading system in which certain embodiments may be employed.

FIG. 10 illustrates a block diagram representative of an example electronic trading system 1000 in which certain embodiments may be employed. The electronic trading system 1000 includes a trading device 1010, a hybrid cloud system 1020, and an exchange 1030. The trading device 1010 may be the same or similar to the trading device 910 described above with reference to FIG. 9. The exchange 1030 may be the same or similar to the exchange 930 described above with reference to FIG. 9. The hybrid cloud system 1020, or one or more components thereof, may provide one or more of the functions of the gateway 920 described above with reference to FIG. 9. That is, the functionality of the gateway 920 described above with reference to FIG. 9, or one or more parts of that functionality, may be included within the hybrid cloud system 1020.

The hybrid cloud system 1020 includes cloud services 1040 and data center 1060. In the example illustrated in FIG. 10, the cloud services 1040 and the components thereof are separate from the data center 1060. However, in other examples (not shown), one or more or all of the components and/or functions of the cloud services 1040 may instead be implemented in the data center 1060. In such examples, or otherwise, the electronic trading system 1000 may not include the cloud services 1040. In such examples, one or more of the functions of the gateway 920 described above with reference to FIG. 9 may be provided by the data center 1060, or one or more components thereof, alone.

In order to provide lower latency for time sensitive processes, the data center 1060 may be co-located with the exchange 1030 or located in proximity to the exchange 1030. Accordingly, functions of the hybrid cloud system 1020 that are time sensitive or otherwise benefit from a lower latency with the exchange 1030, may be carried out by the data center 1060. In general, functions of the hybrid cloud system 1020 that are not time sensitive or do not benefit from lower latency with the exchange 1030, may be carried out by the cloud services 1040. The hybrid cloud system 1020 allows for the electronic trading system 1000 to be scalable with respect to non-time critical functions while still providing relatively low latency with the exchange 1030.

In the example of FIG. 10, the trading device 1010 is in communication with the cloud services 1040 over a first network 1071. For example, the first network 1071 may be a wide area network such as the Internet using a hypertext transfer protocol (HTTP) connection. The trading device 1010 is in communication with the data center 1060 over a second network 1072. For example, the trading device 1010 may communicate with the data center 1060 over a virtual private network using a secure web socket or a TCP connection. The first network 1071 and the second network 1072 may be the same network. The data center 1060 communicates with the cloud services 1040 over a third network 1073. For example, the data center 1060 may communicate with the cloud services 1040 over a private network or virtual private network (VPN) tunnel. The third network 1073 may be the same as the first network 1071 and/or the second network 1072. The data center 1060 communicates with the exchange 1030 over a fourth network 1074. For example, the data center 1060 may communicate with the exchange 1030 using a local area network, a wide area network, a multicast network, a wireless network, a virtual private network, an internal network, a cellular network, a peer-to-peer network, a point-of-presence, a dedicated line, the Internet, a shared memory system, and/or a proprietary network. The fourth network 1074 may be the same as the first network 1071, the second network 1072 and/or the third network 1073.

The cloud services 1040 may be implemented as a virtual private cloud, which may be provided by a logically isolated section of an overall web services cloud. In this example, the cloud services 1040 include a web database 1041 and associated web server 1042, a product database 1043 and associated product data server (PDS) 1044, a user setup database 1045 and associated user setup server 1046, and a transaction database 1047 and associated transaction server 1048.

The trading device 1010 may communicate with the web server 1042. As one example, the trading device 1010 may run a web browser, referred to in this disclosure as a browser, which establishes a browsing session with the web server 1042. This may occur after appropriate domain name resolution to an IP address of the cloud services 1040 and/or after appropriate authentication of the trading device 1010 (or user thereof) with the cloud services 1040. The browser sends requests to the web server 1042, and the web server 1042 provides responses to the browser, for example using the HyperText Transfer Protocol (HTTP) or the Secure HyperText Transfer Protocol (HTTPS) protocol. The web server 1042 may provide a user interface to the browser, via which a user can interact with the electronic trading platform. The user interface may allow market data to be displayed and/or allow trade orders to be placed. As another example, the trading device 1010 may run an application which communicates with the web server 1042, such as via an application programming interface (API), to allow a user to interact with the electronic trading platform. The application may provide a user interface via which a user can interact with the electronic trading platform.

The trading device 1010 may communicate with the PDS 1044. The PDS 1044 interfaces with the Product DB 1043. The Product DB 1043 stores definitions of tradeable objects, as well as permissions of users to place trade orders with respect to tradeable objects. This information may be provided to the trading device 1010. This information may be used by a user interface of the trading device 1010 to determine, for the given user of the trading device 1010, for which tradeable objects trade orders are allowed to be placed.

The trading device 1010 may communicate with the user setup server 1046. The user setup server 1046 interfaces with the user setup database 1045, which stores user's settings, preferences, and other information associated with the user's account. This information may be provided by the trading device 1010 to the user setup server 1046 on user registration, or at certain times after registration, and the user setup server 1046 may store this information in the user setup database 1045. This information may be provided to the trading device 1010. This information may be used by a user interface of the trading device 1010 to determine which market data is to be shown and in which format.

The transaction database 1047 stores information on transactions carried out using the electronic trading system 1000. The transaction database 1047 may store all of the trade orders submitted by users and all of the corresponding order execution reports provided by the exchange 1030 when the trade order is executed. The transaction server 1048 may interrogate the transaction database 1047 to produce an audit trail 1049, for example for a given user. This audit trail 1049 may be provided to the trading device 1010 (or another device) to allow inspection and/or analysis of the trading activity of a given user.

The data center 1060 includes a multicast bus 1061, a price server 1062, an edge server 1063, a risk server 1064, a ledger uploader server 1065, an order connector 1066, and a strategy engine server 1067. The various components within the data center 1060 communicate with one another using the multicast bus 1061. This allows for efficient and scalable communications between the components within the data center 1060. For example, information provided by one of the components may be received by multiple other of the components. Transmitting this information on a multicast bus 1061 to which the other components are subscribed allows for the information to be transmitted in one message, irrespective of how many components may receive the information.

The price server 1062 receives market data from the exchange 1030. The price server 1062 converts this information into a format and/or syntax associated with (for example, used by) the electronic trading system 1000. The price server 1062 transmits the converted information as one or more multicast messages on the multicast bus 1061. Specifically, the price server 1062 multicasts this information on a first multicast bus A, to be received by price clients. The edge server 1063 and the strategy engine server 1067 subscribe to the first multicast bus A, and receive the market data from the price server 1062. The price server 1062 may communicate with the cloud services 1040. For example, the price server 1062 may provide information on products or tradeable objects to the PDS server 1044 for the PDS server 1044 to use in defining tradeable objects.

The edge server 1063 communicates with the trading device 1010. For example, the trading device 1010 may communicate with the edge server 1063 over a secure web socket or a TCP connection. The edge server 1063 may terminate the web (and/or mobile) connection (web socket) with the trading device 1010. In some examples, the edge server 1063 may be implemented as a server cluster. The number of servers in the cluster may be determined and scaled as necessary depending on utilization. The edge server 1063 receives market data over the first multicast bus A, and routes the market data to the trading device 1010. A user of the trading device 1010 may decide to place a trade order based on the market data. The edge server 1063 routes trading orders from the trading device 1010 towards the exchange 1030. Specifically, when the edge server 1063 receives an order message from the trading device 1010, the edge server 1063 multicasts the order message (or at least a portion of the contents thereof) on a second multicast bus B, to be received by order clients. The risk server 1064 subscribes to the second multicast bus B and receives the order message from the edge server 1063.

The risk server 1064 is used to determine a pre-trade risk for a given trade order contained in a given order message. For example, for a given trade order, the risk server 1064 may determine whether or not the user placing the trade order is permitted to do so. The risk server 1064 may determine whether the user is permitted to trade the quantity of the tradeable object specified in the trade order. The risk server 1064 may prevent unauthorized trade orders being placed. The risk server 1064 receives the order message from the edge server 1063 over the second multicast bus B, and processes the order message to determine a risk for the trade order of the message. If the risk server 1064 determines that the trade order should not be placed (for example, a risk associated with the trade order is over a threshold) the risk server 1064 prevents the trade order from being placed. For example, in this case, the risk server 1064 may not transmit the order message to the order connector 1066, and may instead transmit a message indicating to the user that the trade order was not placed. If the risk server 1064 determines that the trade order should be placed (for example, a risk associated with the trade order is below a threshold) the risk server 1064 forwards the order message to the order connector 1066. Specifically, the risk server 1064 multicasts the order message on the second multicast bus B. The order connector 1066 and the ledger uploader 1065 are subscribed to the second multicast bus B and receive the order message from the risk server 1064.

The ledger uploader server 1065 is in communication with the transaction database 1047 of the cloud services 1040. The ledger uploader server 1065 receives the order message from the risk server 1064 and transmits the order message to the transaction database 1047. The transaction database 1047 then stores the order message (or at least a portion of the contents thereof) in the ledger stored in the transaction database 1047.

The order connector 1066 is in communication with the exchange 1030. The order connector 1066 receives the order message from the risk server 1064, processes the order message for sending to the exchange 1030, and sends the processed order message to the exchange 1030. Specifically, the processing includes processing the order message into a data format understood by the exchange 1030. If the trade order within the order message is executed by the exchange 1030, the exchange 1030 sends a corresponding execution report message to the order connector 1066. The execution report message includes an execution report detailing the execution of the trade order. The order connector 1066 applies processing to the execution report message. Specifically, the processing includes processing the execution report message into a data format understood by the electronic trading system and the trading device 1010. The order connector 1066 multicasts the processed execution report message on a third multicast bus C for receipt by execution report clients. The edge server 1063 and the ledger uploader 1065 are subscribed to the third multicast bus C and receive the processed execution report message. The ledger uploader 1065 communicates with the transaction database 1047 to update the ledger with the execution report message (or at least a portion of the contents thereof). The edge server 1063 forwards the execution report message to the trading device 1010. The trading device 1010 may display information based on the execution report message to indicate that the trade order has been executed.

In some examples, order messages may be submitted by the strategy engine server 1067. For example, the strategy engine server 1067 may implement one or more strategy engines using an algorithmic strategy engine and/or an autospreader strategy engine. The strategy engine 1067 receives market data (from the price server 1062 via the first multicast bus A) and automatically generates order messages on the basis of the market data and a suitably configured algorithm. The strategy engine server 1067 transmits an order message to the order connector 1066 (via the risk server 1064 and the second multicast bus B), and the order connector 1066 processes the order message in the same way as described above. Similarly, when the exchange 1030 executes the order, the strategy engine 1067 receives (via the third multicast bus C) a corresponding order execution report message from the order connector 1066. The order message and the execution report message are transmitted to the ledger uploader 1065 in a similar way to as described above, in order for the ledger uploader 1065 to update the ledger stored by the transaction database 1047.

In some examples, the trade orders sent by the trading device 1010 may not be submitted by a person. For example, the trading device 1010 may be a computing device implementing an algorithmic trading application. In these examples, the trading device 1010 may not communicate with the web server 1042, PDS 1044, and/or the user setup server 1046, and may not utilize a browser or a user interface for submitting trades. The application running on the trading device 1010 may communicate with an adapter associated with the edge server 1063. For example, the application and the adapter may communicate with each other using Financial Information Exchange (FIX) messages. In these examples, the adapter may be a FIX adapter. The application running on the trading device 1010 may receive market data in a FIX format (the market data being provided by the price server 1062 and converted into the FIX format by the FIX adapter associated with the edge server 1063). The application running on the trading device 1010 may generate trade orders based on the received market data, and transmit order messages in a FIX format to the FIX adapter associated with the edge server 1063. The FIX adapter associated with the edge server 1063 may process the order messages received in the FIX format into a format understood by the components of the data center 1060.

It is to be understood that the electronic trading system 1000 is merely an example, and other electronic trading systems could be used. As one example, the electronic trading system 1000 need not necessarily include the cloud services 1040. As another example, the data center 1060 may include more or fewer components than described above with reference to FIG. 10. As another example, a form of messaging between components of the data center 1060 other than multicast messaging may be used.

SPECIFIC EXAMPLE SYSTEM FOR ANALYZING USER ACTIVITY

Figure 11:
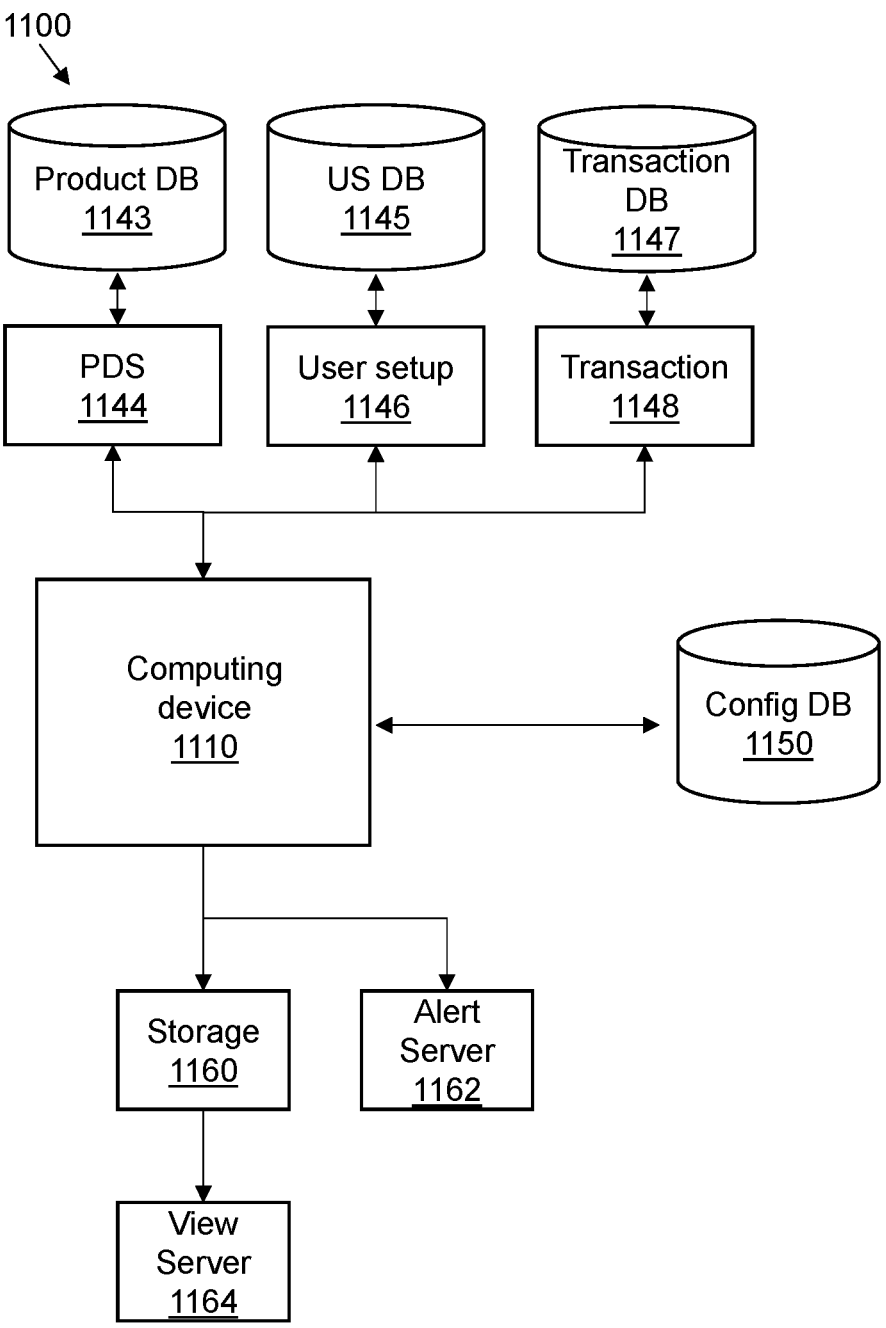
FIG. 11 is a block diagram showing a system for analyzing user activity in an electronic trading system such as one the example electronic trading systems of FIG. 9 and FIG. 10.

FIG. 11 shows a specific example of a system 1100 for analyzing user activity with respect to a composite object. The system 1100 may form part of an electronic trading system, such as the electronic trading systems 900, 1000 described above with reference to FIG. 9 and FIG. 10. In one particular example, the system 1100 may form part of the cloud services 1040 of the electronic trading system 1000 of FIG. 10. For example, the computing device 1110 may be configured to analyze user activity based on an audit trail of user trading activity, such as the audit trail 1049 shown in the example of FIG. 10.

The system 1100 includes a computing device 1110. The computing device 1110 may have any of the features of the computing device 100 and the computing device 200 described above. The computing device 1110 is configured to perform a method of analyzing user activity with respect to a composite activity, which may include the features of any of the example methods described above.

The system 1100 may also include one or more of a product database 1143 and product server 1144, a user setup DB 1145 and user setup server 1146, a transaction database 1147 and transaction server 1048. Each of these may have any of the features of the corresponding components of the system 1000 described above with reference to FIG. 10. Further, the system 1110 further includes a configuration database 1150, a storage 1160, an alert server 1162 and a view server 1164.

The computing device 1110 is operable to obtain sets of event reports, to perform analysis of user activity based on the event reports and to output a result of the analysis. The computing device 1110 operates to obtain a first set of event reports wherein each event report in the first set of event reports represents a respective event occurring with respect to a first object, and a second set of event reports, wherein each event report in the second set of event reports represents a respective event occurring with respect to a second object different from the first object.

In this example, the first object and the second object are respective tradeable objects, which is to say they are tradeable by users in an electronic trading system such as the example systems shown in FIG. 9 and FIG. 10. The event reports may record actions taken by a given user with respect to a given tradeable object, such as actions relating to an order to buy or sell the tradeable object. For example, a given event report may record the placing, removing, or modifying of an order to buy or sell the tradeable object. For instance, a given event report may indicate that a given user placed an order to buy a first tradeable object at a given time. A given event report may include further details of the event, such as a quantity of the object or a price of the object specified by the order. In some examples, the event report may be referred to as an execution report or a trading report. An event report may also indicate an event relating to an order which is not a user action, such as a fill, partial fill, of an order previously placed by a user, or a cancellation, by a third party, of an order previously placed by the user. The user activity may include trading activity of one or more human users and/or one or more machine users, such as one or more automated trading tools.

The first object and the second object may, for example, be tradeable objects which are related to one another. The first object and the second object may be related such that trading activity with respect to one of the first object and the second object can affect a price of the other object. For example, the prices of the first object and the second objects may be correlated. In some examples, the first object and the second object may be different financial instruments relating to a same or similar product. There may be multiple instruments associated with each given product. For example, the first object and the second object may each be futures contracts for a given product, such as corn. The first object and the second object may, for example, different corn futures contracts denoting different respective months.

The computing device 1110 is operable to obtain the event reports for a given elapsed period. For example, the elapsed period may be an elapsed trading session for the tradeable objects to which the event reports relate. The computing device 1110 may, for example, be configured to obtain the first set of event reports and the second event reports following closing of a trading session in which trading occurred on the first object and the second object. This process may be performed as part of a process of examining an audit trail, for example, to determine compliance of users in the trading system with regulatory requirements, or otherwise to determine if certain types of user activity can be identified.

User activity with respect to the composite object including the first object and the second object may be analyzed by the computing device 1110 to determine if the user activity corresponds to certain types of behavior which could be deemed as disruptive or manipulative. The user activity may, for example, be analyzed to detect disruptive or manipulative trading behaviors, such as spoofing, front-running, momentum ignition, abusive messaging, momentum ignition, pinging and wash trading. The user activity may in some cases involve more than one user. For example, collusive behaviors such as collusive spoofing involving two or more users may be detected by analyzing event reports relating to the composite instrument which include event reports representing events initiated by a first user and event reports representing events initiated by one or more further users.

The analysis of the user activity may include any of the features of example methods described above. For example, the events relating to the tradeable composite object may be clustered by applying a clustering process configured to identify clusters of activity which may be relevant to a given type of behavior, for example, spoofing. The clustering process may, for example, be a clustering process as described above with reference to block 502 of FIG. 5 and with reference to FIG. 6A. Following the clustering process, the clusters are analyzed, for example, by a process such as that described above with reference to block 504 of FIG. 5 and with reference to FIG. 6B. For example, features of the clusters may then be determined to be provided to a model configured to provide an estimation of whether the cluster represents the given type of behavior. As an example, where the given type of behavior is spoofing, features of a given cluster which are relevant to spoofing behavior may be computed and input to a model. The model may then use the computed features to provide an estimate of a probability that an expert human analyst would binary-label the given cluster as potential spoofing activity. The model may, for example, be a machine learning model which has been trained on clusters which have been labeled by an expert human analyst. The features of the clusters which are computed may vary depending on the type of behavior to which the analysis relates. In some examples, the features may include the time interval between events in the clusters, the types of events in the cluster, for example, whether they represent placing, modification or cancellation of an order by a user, and whether those orders are buy orders or sell orders. Further, the events may represent actions occurring with respect to orders which have previously been placed by the user, for example, a fill or partial fill of an order, or a cancellation of an order. Such actions may be initiated by another entity in the electronic trading system, such as, for example, the exchange 1030. Moreover, features which are representative of a status of the composite object may be computed, including, for example, a distribution of outstanding orders for the composite object, in terms of their respective volumes and prices as well as whether the orders are buy or sell orders.

In one example, the computing device 1110 obtains from the user setup server 1146 data indicative of a status of entities in the electronic trading system. The entities may include users, companies, and trading accounts. The computing device 1110 then writes these data to the storage 1160. For example, the computing device 1110 may write the data to a file, such as a CSV file, onto a memory (not shown) of the computing device 1110 and copy the file to the storage 1160. The storage 1160 may, for example, include a cloud-based storage server, which may include an AWS S3 (Simple Storage Service) server.

The computing device 1110 then queries the configuration database 1150 to retrieve configurations from the database 1150. The configurations may include details of models for analyzing the events represented by the event reports, such as models to be used in a classification process and/or models to be used in analysis process, each of which may have any of the features described above.

The computing device 1110 may identify companies and relevant accounts from the data obtained from the user setup server 1146 on which to perform analysis of user activity. For example, the computing device 1110 may be configured to analyze user activity occurring with respect to only certain companies and accounts indicated in the data obtained from the user setup server 1146. The event reports which are obtained by the computing device 1112 may then be based on the identified information regarding the companies and accounts whose user activity the computing device 1110 is enabled to analyze.

The computing device 1110 may obtain further information from the product server 1144, such as product names and prices. Moreover, in some examples, the computing device 1110 obtains further information such as order book market data, instrument price chart data, opening and closing times of a given exchange or instrument as needed from one or more further servers (not shown). These data may, in some examples, be used in the analysis of user activity, for example to determine the features of clusters of events with reference to historical price information of the object to which the events being analyzed relate.

Having obtained the event reports and any additional data to be used in the analysis, the computing device 1110 proceeds to analyze the data. The analysis may include any of the features described above with reference to any of the example methods described above with reference to FIG. 2 to FIG. 8B. For example, the computing device 1110 may analyze user activity relating to one or more tradeable objects, including one or more tradeable composite objects. In an example where the computing device 1110 is configured to perform a selection process, the selection process may include any of the features described above with reference to FIG. 7 and FIGS. 8A and 8B. For example, the selection process may include first generating analyses of individual tradeable objects and subsequently using those analyses to determine which individual objects should be included in one or more composite objects. The determination of which objects should be included in a given composite object may differ depending on the type of activity being analyzed. For example, two or more objects may be at risk of being manipulated by a given type of behavior. The two or more objects may then be included in a composite object to be analyzed to detect that given type of behavior. However, those same two or more objects may be at lower or no risk of being manipulated by a different type of behavior and therefore may not be included in a composite instrument for detecting that different type of behavior. For example, the analysis may involve analyzing user activity across two particular objects to detect potential spoofing behavior across those two objects. However, for a different type of behavior, such as front-running, those same two objects may not be suitable for analyzing as a composite object.

The output of the method performed by the computing device 1110 includes the results of the analysis performed on the sets of event reports, which may include respective classifications for each relevant cluster of user activity identified in the analysis. The computing device 1110 outputs the results of the analysis, for example, to the storage 1160.

In some examples, the computing device 1110 is operable to provide a notification to the alert server 1162 under certain circumstances. For example, the computing device 1110 may assess, based on pre-determined alert configurations, whether the results of the analysis indicate that a notification should be sent to the alert server. The computing device 1110 may, for example, obtain the pre-determined alert configurations from the configurations database 1150 or from the alert database 1162. For example, an alert configuration may specify that a notification should be sent to the alert server 1162 if the results of the analysis indicate that one or more clusters is classified as corresponding to the given type of behavior. As mentioned above, in some examples, the classifications include a score indicative of a likelihood that the cluster would be labeled by an expert as corresponding to the given type of behavior. This may be referred to as a risk score. The risk score, in an example, may take a value of from 0 to 100. The alert server 1162 may send an alert to one or more recipients, for example, recipients who have subscribed to receive a given type of alert. The alert may include an email or other type of electronic message. In some examples, the alert may include information regarding the results of the analysis of the cluster or clusters to which the alert relates. In some examples, the alert may include a hyperlink which allows the recipient to view the results of the analysis of the relevant cluster or clusters in more detail.

In some examples, the computing device 1110 may perform post-processing of the results of the analysis, such as to produce summary statistics, such as a number of clusters having a risk score of from 75 to 100. The computing device 1110 may write this information to the storage 1160 and/or the configuration database 1150.

The view server 1164 may be configured to query the results from the storage 1160 for display by a client device (not shown). The client device may be a device operated by user to whom the analysis relates, for example, a trader. Alternatively, the client device may be a device operated by a person surveilling the trading activity of users in the network, such as a regulator or a regulatory compliance officer of a given organization. The view server 1164 may be subscribed to receive a notification when the results of the analysis process are uploaded to the storage 1160. The view server 1164 may then update an in-memory state and cache to obtain the new results of the analysis for providing to the client device.

As used herein, the phrases "configured to" and "adapted to" encompass that an element, structure, or device has been modified, arranged, changed, or varied to perform a specific function or for a specific purpose.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

CLAUSES

1. A method including: obtaining, by a computing device: a first set of event reports, wherein each event report in the first set of event reports represents a respective event occurring with respect to a first object; and a second set of event reports, wherein each event report in the second set of event reports represents a respective event occurring with respect to a second object different from the first object; generating, by the computing device and using the first set of event reports and the second set of event reports, a list of events occurring with respect to a composite object including the first object and the second object; and generating, by the computing device and using the list of events, an analysis of user activity with respect to the composite object by performing an analysis process with respect to the events in the list of events.

2. The method of clause 1, wherein: the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

3. The method of clause 1 or clause 2, wherein the analysis process includes: performing a clustering process with respect to the events in the list of events to generate one or more clusters of events; and analyzing the clusters to generate the analysis of the user activity with respect to the composite object.

4. The method of clause 3, wherein the clustering process includes generating the one or more clusters of events based on respective times of occurrence of the events.

5. The method of clause 3 or clause 4, wherein the analyzing the clusters includes: performing a classification process to determine respective classifications of the one or more clusters of events, wherein a given classification of a given cluster of events is indicative of an estimation of whether the given cluster of events represents a given type of user activity.

6. The method of clause 5, wherein the classification process includes: computing respective features of the one or more clusters of events; and determining the respective classifications of the one or more clusters of events based on their respective features by use of a classification model.

7. The method of any of clause 3 to clause 6, wherein the clustering process is based on a given type of the analysis of the user activity to be generated, and wherein the analyzing the clusters includes analyzing the clusters based on the given type of the analysis of the user activity.

8. The method of any of clause 1 to clause 7, wherein one or more features of the analysis process are based on a given type of the analysis of the user activity to be generated.

9. The method of any of clause 1 to clause 8, including: performing a selection process to select, from a plurality of sets of event reports including the first set of event reports and the second set of event reports, the first set of event reports and the second set of event reports for the obtaining and the generating the list of events.

10. The method of clause 9, wherein the selection process includes: performing a first analysis process with respect to the events represented by the event reports in the first set of event reports to generate a first analysis of user activity with respect to the first object; performing a second analysis process with respect to the events represented by the event reports in the second set of event reports to generate a second analysis of user activity with respect to the second object; and selecting, based on the first analysis and the second analysis, the first set of event reports and the second set of event reports.

11. The method of clause 10, wherein: the first analysis process includes performing a clustering process with respect to the events represented by the event reports in the first set of event reports to generate a first set of clusters of events; the second analysis process includes performing a clustering process with respect to the events represented by the event reports in the second set of event reports to generate a second set of clusters of events; and the selecting of the first set of event reports and the second set of event reports is based on a comparison between one or more clusters of the first set of clusters and one or more clusters of the second set of second clusters.

12. The method of clause 11, wherein the one or more clusters of the first set of clusters and the one or more clusters of the second set of clusters each span a respective time period, and wherein the comparison between the one or more clusters of the first set of clusters and the one or more clusters of the second set of clusters includes a determination of whether a respective time period of the one or more clusters of the first set of clusters overlaps in time with a respective time period of the one or more clusters of the second set of clusters.

13. The method of clause 12, wherein the comparison between the one or more clusters of the first set of clusters and the one or more clusters of the second set of clusters includes: determining respective classifications of a given cluster of the first set of clusters and a given cluster of the second set of clusters which overlaps in time with the given cluster of the first set of clusters; and determining if the respective classification of at least one of the overlapping clusters satisfies a pre-determined criterion.

14. The method of any of clause 1 to clause 13, wherein the events occurring with respect to the first object and the events occurring with respect to the second object are events occurring over a same pre-determined elapsed period.

15. The method of clause 14, wherein the pre-determined elapsed period is a period of fixed length or a period of a user activity session.

16. The method of any of clause 1 to clause 15, wherein the analysis of the user activity with respect to the composite object includes an indication of an estimation of whether the user activity corresponds to a particular user behavior.

17. The method of any of clause 1 to clause 16, wherein the first object and the second object are respective first and second tradable objects, and wherein the events represented by the event reports in the first set of event reports relate to orders on the first tradable object and the events represented by the event reports in the second set of event reports relate to orders on the second tradable object.

18. The method of clause 17, wherein the given user behavior includes market manipulation behavior, such as spoofing, front-running or momentum ignition.

19. A tangible computer-readable storage medium including instructions that, when executed, cause a computing device to: obtain: a first set of event reports, wherein each event report in the first set of event reports represents a respective event occurring with respect to a first object; and a second set of event reports, wherein each event report in the second set of event reports represents a respective event occurring with respect to a second object different from the first object; generate, using the first set of event reports and the second set of event reports, a list of events occurring with respect to a composite object including the first object and the second object; and generate, using the list of events, an analysis of user activity with respect to the composite object by performing an analysis process with respect to the events in the list of events.

20. The tangible computer-readable storage medium of clause 19, wherein: the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

21. The tangible computer-readable storage medium of clause 19 or clause 20, wherein the analysis process includes: performing a clustering process with respect to the events in the list of events to generate one or more clusters of events; and analyzing the clusters to generate the analysis of the user activity with respect to the composite object.

22. The tangible computer-readable storage medium of clause 21, wherein the clustering process includes generating the one or more clusters of events based on respective times of occurrence of the events.

23. The tangible computer-readable storage medium of clause 21 or clause 22, wherein the analyzing the clusters includes: performing a classification process to determine respective classifications of the one or more clusters of events, wherein a given classification of a given cluster of events is indicative of an estimation of whether the given cluster of events represents a given type of user activity.

24. The tangible computer-readable storage medium of clause 23, wherein the classification process includes: computing respective features of the one or more clusters of events; and determining the respective classifications of the one or more clusters of events based on their respective features by use of a classification model.

25. The tangible computer-readable storage medium of any of clause 21 to clause 24, wherein the clustering process is based on a given type of the analysis of the user activity to be generated, and wherein the analyzing the clusters includes analyzing the clusters based on the given type of the analysis of the user activity.

26. The tangible computer-readable storage medium of any of clause 20 to clause 25, wherein one or more features of the analysis process are based on a given type of the analysis of the user activity to be generated.

27. The tangible computer-readable storage medium of any of clause 20 to clause 26, including: performing a selection process to select, from a plurality of sets of event reports including the first set of event reports and the second set of event reports, the first set of event reports and the second set of event reports for the obtaining and the generating the list of events.

28. The tangible computer-readable storage medium of clause 27, wherein the selection process includes: performing a first analysis process with respect to the events represented by the event reports in the first set of event reports to generate a first analysis of user activity with respect to the first object; performing a second analysis process with respect to the events represented by the event reports in the second set of event reports to generate a second analysis of user activity with respect to the second object; and selecting, based on the first analysis and the second analysis, the first set of event reports and the second set of event reports.

29. The tangible computer-readable storage medium of clause 28, wherein: the first analysis process includes performing a clustering process with respect to the events represented by the event reports in the first set of event reports to generate a first set of clusters of events; the second analysis process includes performing a clustering process with respect to the events represented by the event reports in the second set of event reports to generate a second set of clusters of events; and the selecting of the first set of event reports and the second set of event reports is based on a comparison between one or more clusters of the first set of clusters and one or more clusters of the second set of second clusters.

30. The tangible computer-readable storage medium of clause 29, wherein the one or more clusters of the first set of clusters and the one or more clusters of the second set of clusters each span a respective time period, and wherein the comparison between the one or more clusters of the first set of clusters and the one or more clusters of the second set of clusters includes a determination of whether a respective time period of the one or more clusters of the first set of clusters overlaps in time with a respective time period of the one or more clusters of the second set of clusters.

31. The tangible computer-readable storage medium of clause 30, wherein the comparison between the one or more clusters of the first set of clusters and the one or more clusters of the second set of clusters includes: determining respective classifications of a given cluster of the first set of clusters and a given cluster of the second set of clusters which overlaps in time with the given cluster of the first set of clusters; and determining if the respective classification of at least one of the overlapping clusters satisfies a predetermined criterion.

32. The tangible computer-readable storage medium of any of clause 20 to clause 31, wherein the events occurring with respect to the first object and the events occurring with respect to the second object are events occurring over a same pre-determined elapsed period.

33. The tangible computer-readable storage medium of clause 32, wherein the pre-determined elapsed period is a period of fixed length or a period of a user activity session.

34. The tangible computer-readable storage medium of any of clause 20 to clause 33, wherein the analysis of the user activity with respect to the composite object includes an indication of an estimation of whether the user activity corresponds to a particular user behavior.

35. The tangible computer-readable storage medium of any of clause 20 to clause 34, wherein the first object and the second object are respective first and second tradable objects, and wherein the events represented by the event reports in the first set of event reports relate to orders on the first tradable object and the events represented by the event reports in the second set of event reports relate to orders on the second tradable object.

36. The tangible computer-readable storage medium of clause 35, wherein the given user behavior includes market manipulation behavior, such as spoofing, front-running or momentum ignition.

37. A computing device including: a report obtainer to obtain: a first set of event reports, wherein each event report in the first set of event reports represents a respective event occurring with respect to a first object; and a second set of event reports, wherein each event report in the second set of event reports represents a respective event occurring with respect to a second object different from the first object; a list generator to generate, using the first set of event reports and the second set of event reports, a list of events occurring with respect to a composite object including the first object and the second object; and an analyzer to generate, using the list of events, an analysis of user activity with respect to the composite object by performing an analysis process with respect to the events in the list of events.

38. The computing device of clause 37, wherein: the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

39. The computing device of clause 37 or clause 38, wherein the analysis process includes: performing a clustering process with respect to the events in the list of events to generate one or more clusters of events; and analyzing the clusters to generate the analysis of the user activity with respect to the composite object.

40. The computing device of clause 39, wherein the clustering process includes generating the one or more clusters of events based on respective times of occurrence of the events.

41. The computing device of clause 39 or clause 40, wherein the analyzing the clusters includes: performing a classification process to determine respective classifications of the one or more clusters of events, wherein a given classification of a given cluster of events is indicative of an estimation of whether the given cluster of events represents a given type of user activity.

42. The computing device of clause 41, wherein the classification process includes: computing respective features of the one or more clusters of events; and determining the respective classifications of the one or more clusters of events based on their respective features by use of a classification model.

43. The computing device of any of clause 39 to clause 42, wherein the clustering process is based on a given type of the analysis of the user activity to be generated, and wherein the analyzing the clusters includes analyzing the clusters based on the given type of the analysis of the user activity.

44. The computing device of any of clause 37 to clause 43, wherein one or more features of the analysis process are based on a given type of the analysis of the user activity to be generated.

45. The computing device of any of clause 37 to clause 44, including: performing a selection process to select, from a plurality of sets of event reports including the first set of event reports and the second set of event reports, the first set of event reports and the second set of event reports for the obtaining and the generating the list of events.

46. The computing device of clause 45, wherein the selection process includes: performing a first analysis process with respect to the events represented by the event reports in the first set of event reports to generate a first analysis of user activity with respect to the first object; performing a second analysis process with respect to the events represented by the event reports in the second set of event reports to generate a second analysis of user activity with respect to the second object; and selecting, based on the first analysis and the second analysis, the first set of event reports and the second set of event reports.

47. The computing device of clause 46, wherein: the first analysis process includes performing a clustering process with respect to the events represented by the event reports in the first set of event reports to generate a first set of clusters of events; the second analysis process includes performing a clustering process with respect to the events represented by the event reports in the second set of event reports to generate a second set of clusters of events; and the selecting of the first set of event reports and the second set of event reports is based on a comparison between one or more clusters of the first set of clusters and one or more clusters of the second set of second clusters.

48. The computing device of clause 47, wherein the one or more clusters of the first set of clusters and the one or more clusters of the second set of clusters each span a respective time period, and wherein the comparison between the one or more clusters of the first set of clusters and the one or more clusters of the second set of clusters includes a determination of whether a respective time period of the one or more clusters of the first set of clusters overlaps in time with a respective time period of the one or more clusters of the second set of clusters.

49. The computing device of clause 48, wherein the comparison between the one or more clusters of the first set of clusters and the one or more clusters of the second set of clusters includes: determining respective classifications of a given cluster of the first set of clusters and a given cluster of the second set of clusters which overlaps in time with the given cluster of the first set of clusters; and determining if the respective classification of at least one of the overlapping clusters satisfies a pre-determined criterion.

50. The computing device of any of clause 37 to clause 49, wherein the events occurring with respect to the first object and the events occurring with respect to the second object are events occurring over a same pre-determined elapsed period.

51. The computing device of clause 50, wherein the pre-determined elapsed period is a period of fixed length or a period of a user activity session.

52. The computing device of any of clause 37 to clause 51, wherein the analysis of the user activity with respect to the composite object includes an indication of an estimation of whether the user activity corresponds to a particular user behavior.

53. The computing device of any of clause 37 to clause 52, wherein the first object and the second object are respective first and second tradable objects, and wherein the events represented by the event reports in the first set of event reports relate to orders on the first tradable object and the events represented by the event reports in the second set of event reports relate to orders on the second tradable object.

54. The computing device of clause 53, wherein the given user behavior includes market manipulation behavior, such as spoofing, front-running or momentum ignition.

The invention claimed is:

1. A method including:

obtaining, by a computing device, a first set of event reports, wherein each event report in the first set of event reports represents a respective event occurring with respect to a first object, and a second set of event reports, wherein each event report in the second set of event reports represents a respective event occurring with respect to a second object different from the first object;

defining, by the computing device, a composite object including the first object and the second object;

generating, by the computing device and using the first set of event reports and the second set of event reports, a list of events occurring with respect to the composite object;

performing, by the computing device, a clustering process with respect to the events in the list of events to generate one or more clusters of events, wherein the clustering process includes generating the one or more clusters of events based on respective times of occurrence of the events, wherein a time interval between consecutive events in a particular cluster is not greater than a pre-determined time interval;

generating, by the computing device and using the one or more clusters of events, an analysis of user activity with respect to the composite object by performing an analysis process with respect to the events in the one or more clusters of events, wherein one or more features of the analysis process are based on a given type of the analysis of the user activity to be generated, wherein the analysis process with respect to the events in the one or more clusters of events includes performing a classification process to determine respective classifications of the one or more clusters of events, wherein a given classification of a given cluster of events is indicative of an estimation of whether the given cluster of events represents the given type of user activity; and providing, by the computing device, notification to an alert server based on an alert configuration when the analysis of user activity with respect to the composite object indicates a particular behavior.

2. The method of claim 1, wherein:

the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

3. The method of claim 1, wherein the classification process includes:

computing respective features of the one or more clusters of events; and determining the respective classifications of the one or more clusters of events based on their respective features by use of a classification model.

4. The method of claim 1, wherein the clustering process is based on the given type of the analysis of the user activity to be generated, and wherein the analyzing the clusters includes analyzing the clusters based on the given type of the analysis of the user activity.

5. The method of claim 1, further including:

performing a selection process to select, from a plurality of sets of event reports including the first set of event reports and the second set of event reports, wherein the selection process includes:

performing a first analysis process with respect to the events represented by the event reports in the first set of event reports to generate a first analysis of user activity with respect to the first object, wherein the first analysis process includes performing a clustering process with respect to the events represented by the event reports in the first set of event reports to generate a first set of clusters of events;

performing a second analysis process with respect to the events represented by the event reports in the second set of event reports to generate a second analysis of user activity with respect to the second object, wherein the second analysis process includes performing a clustering process with respect to the events represented by the event reports in the second set of event reports to generate a second set of clusters of events; and selecting, based on the first analysis and the second analysis, the first set of event reports and the second set of event reports, wherein the selecting of the first set of event reports and the second set of event reports is based on a comparison between one or more clusters of the first set of clusters and one or more clusters of the second set of second clusters, wherein the one or more clusters of the first set of clusters and the one or more clusters of the second set of clusters each span a respective time period, wherein the comparison between the one or more clusters of the first set of clusters and the one or more clusters of the second set of clusters includes a determination of whether a respective time period of the one or more clusters of the first set of clusters overlaps in time with a respective time period of the one or more clusters of the second set of clusters, wherein the comparison between the one or more clusters of the first set of clusters and the one or more clusters of the second set of clusters includes:

determining respective classifications of a given cluster of the first set of clusters and a given cluster of the second set of clusters which overlaps in time with the given cluster of the first set of clusters; and determining if the respective classification of at least one of the overlapping clusters satisfies a pre-determined criterion.

6. The method of claim 1, wherein the events occurring with respect to the first object and the events occurring with respect to the second object are events occurring over a same pre-determined elapsed period.

7. The method of claim 6, wherein the pre-determined elapsed period is a period of fixed length or a period of a user activity session.

8. The method of claim 1, wherein the analysis of the user activity with respect to the composite object includes an indication of an estimation of whether the user activity corresponds to the particular behavior.

9. The method of claim 1, wherein the first object and the second object are respective first and second tradable objects, and wherein the events represented by the event reports in the first set of event reports relate to orders on the first tradable object and the events represented by the event reports in the second set of event reports relate to orders on the second tradable object.

10. The method of claim 9, wherein the particular behavior includes market manipulation behavior, such as spoofing, front-running or momentum ignition.

11. A non-transitory computer readable medium having stored therein instructions executable by a processor, wherein the instructions are executable to:

obtain a first set of event reports, wherein each event report in the first set of event reports represents a respective event occurring with respect to a first object, and a second set of event reports, wherein each event report in the second set of event reports represents a respective event occurring with respect to a second object different from the first object;

define a composite object including the first object and the second object;

generate, using the first set of event reports and the second set of event reports, a list of events occurring with respect to the composite object;

perform a clustering process with respect to the events in the list of events to generate one or more clusters of events, wherein the clustering process includes generating the one or more clusters of events based on respective times of occurrence of the events, wherein a time interval between consecutive events in a particular cluster is not greater than a pre-determined time interval;

generate, using the one or more clusters of events, an analysis of user activity with respect to the composite object by performing an analysis process with respect to the events in the one or more clusters of events, wherein one or more features of the analysis process are based on a given type of the analysis of the user activity to be generated, wherein the analysis process with respect to the events in the one or more clusters of events includes performing a classification process to determine respective classifications of the one or more clusters of events, wherein a given classification of a given cluster of events is indicative of an estimation of whether the given cluster of events represents the given type of user activity; and provide notification to an alert server based on an alert configuration when the analysis of user activity with respect to the composite object indicates a particular behavior.

12. The non-transitory computer readable medium of claim 11, wherein:

the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

13. The non-transitory computer readable medium of claim 11, wherein the clustering process is based on the given type of the analysis of the user activity to be generated, and wherein the analyzing the clusters includes analyzing the clusters based on the given type of the analysis of the user activity.

14. The non-transitory computer readable medium of claim 11, wherein the events occurring with respect to the first object and the events occurring with respect to the second object are events occurring over a same pre-determined elapsed period.

15. The non-transitory computer readable medium of claim 11, wherein the analysis of the user activity with respect to the composite object includes an indication of an estimation of whether the user activity corresponds to the particular behavior.

16. A system including:

a computing device, wherein the computing device is configured to:

obtain a first set of event reports, wherein each event report in the first set of event reports represents a respective event occurring with respect to a first object, and a second set of event reports, wherein each event report in the second set of event reports represents a respective event occurring with respect to a second object different from the first object;

define a composite object including the first object and the second object;

generate, using the first set of event reports and the second set of event reports, a list of events occurring with respect to the composite object;

perform a clustering process with respect to the events in the list of events to generate one or more clusters of events, wherein the clustering process includes generating the one or more clusters of events based on respective times of occurrence of the events, wherein a time interval between consecutive events in a particular cluster is not greater than a pre-determined time interval;

generate, using the one or more clusters of events, an analysis of user activity with respect to the composite object by performing an analysis process with respect to the events in the one or more clusters of events, wherein one or more features of the analysis process are based on a given type of the analysis of the user activity to be generated, wherein the analysis process with respect to the events in the one or more clusters of events includes performing a classification process to determine respective classifications of the one or more clusters of events, wherein a given classification of a given cluster of events is indicative of an estimation of whether the given cluster of events represents the given type of user activity; and provide notification to an alert server based on an alert configuration when the analysis of user activity with respect to the composite object indicates a particular behavior.

17. The system of claim 16, wherein:

the event reports in the first set of event reports and the event reports in the second set of event reports are indicative of respective times of occurrence of the events represented by the event reports in the first set of event reports and the event reports in the second set of event reports; and the generating the list of events includes ordering the events based on the respective times of occurrence of the events.

18. The system of claim 16, wherein the clustering process is based on the given type of the analysis of the user activity to be generated, and wherein the analyzing the clusters includes analyzing the clusters based on the given type of the analysis of the user activity.

19. The system of claim 16, wherein the events occurring with respect to the first object and the events occurring with respect to the second object are events occurring over a same pre-determined elapsed period.

20. The system of claim 16, wherein the analysis of the user activity with respect to the composite object includes an indication of an estimation of whether the user activity corresponds to the particular behavior.

* * * * *